US012773729B2

(12) United States Patent
Reeves-Hall et al.

(10) Patent No.: US 12,773,729 B2
(45) Date of Patent: Oct. 27, 2026

(54) PHOTONIC LANTERN ARRAY

(71) Applicant: VulcanForms Inc., Devens, MA (US)

(72) Inventors: Peter Colin Reeves-Hall, Whitinsville, MA (US); Manuel Joseph Leonardo, Bolton, MA (US)

(73) Assignee: VulcanForms Inc., Devens, MA (US)

(*) Notice: Subject to any disclaimer, the term of this patent is extended or adjusted under 35 U.S.C. 154(b) by 266 days.

(21) Appl. No.: 18/627,564

(22) Filed: Apr. 5, 2024

(65) Prior Publication Data

US 2024/0335884 A1 Oct. 10, 2024

Related U.S. Application Data

(60) Provisional application No. 63/457,518, filed on Apr. 6, 2023.

(51) Int. Cl.

| | |
|---|---|
| ***B22F 12/41*** | (2021.01) |
| ***B22F 10/36*** | (2021.01) |
| ***B22F 10/85*** | (2021.01) |
| ***B22F 12/45*** | (2021.01) |
| ***B22F 12/90*** | (2021.01) |
| ***B33Y 10/00*** | (2015.01) |

(Continued)

(52) U.S. Cl.

CPC .............. *B22F 12/41* (2021.01); *B22F 10/36* (2021.01); *B22F 10/85* (2021.01); *B22F 12/45* (2021.01); *B22F 12/90* (2021.01); *B33Y 10/00* (2014.12); *B33Y 30/00* (2014.12); *B33Y 50/02* (2014.12)

(58) Field of Classification Search

CPC .......... B22F 12/41; B22F 10/36; B22F 10/85; B22F 12/45; B22F 12/90; B33Y 30/00; B33Y 10/00; B33Y 50/02

See application file for complete search history.

(56) References Cited

U.S. PATENT DOCUMENTS

| | | | |
|---|---|---|---|
| 8,124,192 | B2 | 2/2012 | Paasche et al. |
| 8,958,145 | B2 | 2/2015 | Rothenberg |
| 9,411,100 | B2 | 8/2016 | Fontaine et al. |

(Continued)

FOREIGN PATENT DOCUMENTS

| | | | |
|---|---|---|---|
| EP | 3 521 028 | A1 | 8/2019 |
| WO | WO 2025/006255 | A2 | 1/2025 |

*Primary Examiner* — Jessee R Roe

(74) *Attorney, Agent, or Firm* — Wolf, Greenfield & Sacks, P.C.

(57) ABSTRACT

Fiber optic laser energy paths including photonic lanterns for use in additive manufacturing systems are disclosed. According to some embodiments, a plurality of photonic lanterns are configured to combine laser energy from a plurality of laser energy sources. According to other embodiments, a first plurality of photonic lanterns may combine laser energy from a plurality of laser energy sources and a second plurality of photonic lanterns may furcate the combined laser energy and direct the furcated laser energy to form a plurality of laser energy pixels on a build surface. Laser energy paths including photonic lanterns my provide enhanced control and redundancy within an additive manufacturing system. The disclosure may apply to laser paths for all types of additive manufacturing systems. Some disclosed embodiments are directed to powder bed fusion additive manufacturing systems including a plurality of laser power sources.

40 Claims, 13 Drawing Sheets

(51) Int. Cl.

| | |
|---|---|
| ***B33Y 30/00*** | (2015.01) |
| ***B33Y 50/02*** | (2015.01) |

(56) References Cited

U.S. PATENT DOCUMENTS

| | | | |
|---|---|---|---|
| 9,956,612 | B1 | 5/2018 | Redding et al. |
| 10,022,795 | B1 | 7/2018 | Redding et al. |
| 10,035,219 | B2 | 7/2018 | Coward |
| 10,213,797 | B2 | 2/2019 | Coward et al. |
| 10,226,780 | B2 | 3/2019 | Coward et al. |
| 10,647,104 | B2 | 5/2020 | Kobayashi et al. |
| 10,800,615 | B2 | 10/2020 | Coward |
| 11,267,074 | B2 | 3/2022 | Vorontsov et al. |
| 2016/0158889 | A1 | 6/2016 | Carter et al. |
| 2016/0368050 | A1 | 12/2016 | Morris et al. |
| 2017/0021455 | A1 | 1/2017 | Dallarosa et al. |
| 2017/0056975 | A1 | 3/2017 | Carter et al. |
| 2018/0200792 | A1 | 7/2018 | Redding et al. |
| 2018/0207722 | A1 | 7/2018 | Feldmann et al. |
| 2018/0236549 | A1 | 8/2018 | Spears et al. |
| 2018/0361664 | A1 | 12/2018 | Budge |
| 2018/0361665 | A1 | 12/2018 | Budge |
| 2019/0143406 | A1 | 5/2019 | Carter et al. |
| 2019/0299286 | A1 | 10/2019 | Feldmann et al. |
| 2019/0315064 | A1 | 10/2019 | Budge et al. |
| 2020/0039000 | A1 | 2/2020 | Sweetland |
| 2020/0108465 | A1 | 4/2020 | Sweetland |
| 2020/0230745 | A1 | 7/2020 | Komsta et al. |
| 2020/0376761 | A1 | 12/2020 | Sweetland |
| 2021/0291445 | A1 | 9/2021 | Coward |
| 2021/0291446 | A1 | 9/2021 | Coward |
| 2021/0339318 | A1 | 11/2021 | Dunbar et al. |
| 2022/0009030 | A1 | 1/2022 | Dadelszen et al. |
| 2022/0212255 | A1 * | 7/2022 | Gadzalinska ......... B22F 1/0545 |
| 2023/0056367 | A1 | 2/2023 | Leonardo et al. |

* cited by examiner

PHOTONIC LANTERN ARRAY

RELATED APPLICATIONS

This application claims priority under 35 U.S.C. § 119(e) to U.S. Provisional Application No. 63/457,518, filed Apr. 6, 2023, the content of which is incorporated by reference in its entirety for all purposes.

FIELD

Disclosed embodiments are generally related to energy paths for additive manufacturing processes including photonic lantern arrays.

BACKGROUND

Additive manufacturing systems employ various techniques to create three-dimensional objects from two-dimensional layers. After a layer of precursor material is deposited onto a build surface, a portion of the layer may be fused through exposure to one or more energy sources to create a desired two-dimensional geometry of solidified material within the layer. Next, the build surface may be indexed, and another layer of precursor material may be deposited. For example, in conventional systems, the build surface may be indexed downwardly by a distance corresponding to a thickness of a layer. This process may be repeated layer-by-layer to fuse many two-dimensional layers into a three-dimensional object.

SUMMARY

According to some aspects, an additive manufacturing system comprises a build surface, a plurality of laser energy sources, and a plurality of photonic lanterns optically coupled to the plurality of laser energy sources. Each photonic lantern of the plurality of photonic lanterns is configured to combine laser energy from at least two laser energy sources of the plurality of laser energy sources. The additive manufacturing system comprises an optics assembly configured to direct laser energy from the plurality of photonic lanterns toward the build surface to form a corresponding plurality of laser energy pixels on the build surface.

According to some aspects, an additive manufacturing system comprises a build surface, a plurality of laser energy sources, and a first plurality of photonic lanterns optically coupled to the plurality of laser energy sources and a second plurality of photonic lanterns optically coupled to the first plurality of photonic lanterns. Each photonic lantern of the first plurality of photonic lanterns is configured to combine laser energy from at least two laser energy sources of the plurality of laser energy sources. Each photonic lantern of the second plurality of photonic lanterns is configured to combine laser energy from at least two photonic lanterns of the first plurality of photonic lanterns to form a plurality of laser energy pixels on the build surface.

According to aspects, a method for operating an additive manufacturing system is provided. The method comprises emitting laser energy from a plurality of laser energy sources, combining the laser energy from the plurality of laser energy sources within a plurality of photonic lanterns, directing the laser energy from the plurality of photonic lanterns toward the build surface to form a corresponding plurality of laser energy pixels on the build surface, and building one or more parts on a build surface using the laser energy in the plurality of laser energy pixels.

According to some aspects, a method for operating an additive manufacturing system is provided. The method comprises emitting laser energy from a plurality of laser energy sources, combining the laser energy from the plurality of laser energy sources within a first plurality of photonic lanterns, combining the laser energy from the first plurality of photonic lanterns within a second plurality of photonic lanterns, forming a plurality of laser energy pixels on a build surface with laser energy output from the second plurality of photonic lanterns, and building one or more parts on a build surface using the laser energy in the plurality of laser energy pixels.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

Other advantages and novel features of the present disclosure will become apparent from the following detailed description of various non-limiting embodiments of the disclosure when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
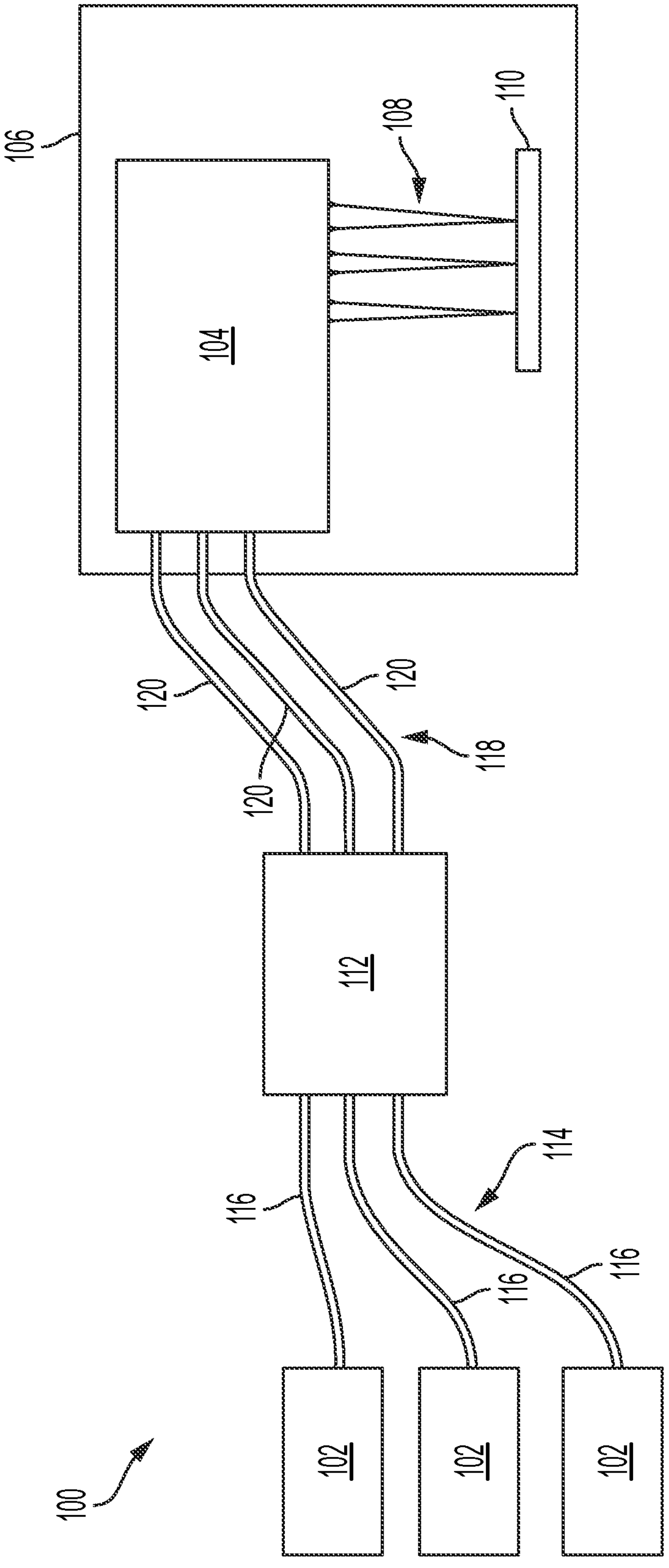
FIG. 1 shows a schematic representation of an additive manufacturing system according to some embodiments.

Some additive manufacturing processes, such as some aspects of powder bed fusion additive manufacturing processes, utilize a plurality of laser energy sources to form parts by fusing a powdered metal precursor material in a desired pattern. The Inventors have recognized that it may be desirable for such additive manufacturing processes to increase the reliability and redundancy of multiple laser energy paths utilized in such systems. For example, one laser energy source may fail during a build, which may prompt reconfiguration of a build plan, unplanned pauses, longer build times, changes in part quality or other undesired effects. In some cases, a build may even need to be abandoned. Thus, it may be desirable to increase redundancy without otherwise unused duplication of equipment, such as laser energy sources. It may also be desirable to increase redundancy while maintaining low losses within an energy path, such as to reduce undesirable heating of components therein in some embodiments. Additionally, greater control over a network of energy paths for laser energy may provide benefits during portions of an additive manufacturing processes.

In view of the above, the Inventors have recognized and appreciated improvements in additive manufacturing systems including photonic lanterns disposed along energy paths that convey laser energy from a plurality of laser energy sources to a build surface. According to some embodiments, a plurality of photonic lanterns are optically coupled to a plurality of laser energy sources, and each photonic lantern of the plurality of photonic lanterns may be configured to combine laser energy from at least two laser energy sources. An optics assembly may be configured to direct laser energy from the plurality of photonic lanterns toward the build surface to form a corresponding plurality of separately controllable laser energy pixels on the build surface. In other related embodiments, a first plurality of photonic lanterns may be optically coupled to a plurality of laser energy sources, and each photonic lantern of the first plurality of photonic lanterns may be configured to combine laser energy from at least two laser energy sources. A second plurality of photonic lanterns may be optically coupled to the first plurality of photonic lanterns. Each photonic lantern of the second plurality of photonic lanterns may be configured to combine laser energy from at least two photonic lanterns of the first plurality of photonic lanterns to form a plurality of separately controllable laser energy pixels on the build surface. Photonic lanterns may provide redundancy within the energy paths of an additive manufacturing systems. Thus, photonic lanterns may be used to create a network of energy paths within an additive manufacturing system that may allow for switching of energy paths within that network with minimal loss of laser energy within the energy paths.

As used herein, a "photonic lantern" may refer to a fiber optic device comprising a furcation or joining of a plurality of optical fibers wherein a plurality of single mode fibers are adiabatically combined into a multimode fiber and wherein the sum of the modes within the total number of input fiber(s) are less than or equal to or greater than the sum of the modes of the total number of output fibers. Depending on the specific embodiment, a photonic lantern may be operated to combine laser energy from a plurality of optical fibers attached to an upstream portion of the photonic lantern into a single output fiber optically coupled to a downstream portion of the photonic lantern or into a plurality of output fibers which may either be greater than or less than the number of input fibers. In some embodiments, a photonic lantern may include a single upstream input fiber and multiple downstream output fibers optically coupled to the photonic lantern. Accordingly, photonic lanterns may be used to provide a number of different optical arrangements to accommodate a number of different desired energy paths within a system. In some embodiments, a photonic lantern may also be operated to direct and/or selectively switch laser energy from one or more input fiber(s) to selected output fiber(s). In some embodiments a pair of photonic lanterns may be coupled such that a first photonic lantern combining multiple input fibers is immediately upstream of a second photonic lantern, the output of the first photonic lantern directed solely to the second photonic lantern. The second photonic lantern furcates the output of the first photonic lantern, with the result that the pair of the first photonic lantern and the second photonic lantern may form an n to n lantern pair or an n to m lantern pair where n and m are positive integers greater than one which describe a number of inputs and/or outputs of the lantern pair. Where a lantern pair may exist, describing a function of one photonic lantern of the lantern pair should not be interpreted to indicate that a second photonic lantern of the lantern pair may not be present. A lantern pair may allow switching between inputs and outputs as previously described with respect to single lantern and may be functionally two separate lanterns even though by packaging/proximity the lantern pair may appear as a single device. Fused fiber couplers may be used to construct an n to n or an n to m branching of optical fibers although fused fiber couplers may lack some functionalities (such as switching functionality) found in one or more photonic lanterns. Fused fiber couplers and photonic lanterns may not be functionally equivalent devices in an energy path.

Within an additive manufacturing system, photonic lanterns may selectively direct laser energy to follow a specific path from among multiple furcating energy paths. In this way, photonic lanterns may act as a switch to change between possible energy paths without any physical manipulation or reconfiguration of the hardware that forms the energy path. A photonic lantern may switch or redirect a downstream energy path by modulating a phase of an upstream laser energy source that provides laser energy to the photonic lantern. For instance, an additive manufacturing system may include a first laser energy source and a second laser energy source configured to form a first laser energy pixel and a second laser energy pixel on the build surface. Photonic lanterns may direct the laser energy from the first laser energy source to the first laser energy pixel, and from the second laser energy source to the second laser energy pixel. Without changing the physical structure or connections of the optical fibers that form the energy path, the photonic lanterns may redirect laser energy from the first laser energy source to the second laser energy pixel and/or from the second laser energy source to the first laser energy pixel. In this way, the photonic lanterns may redirect laser energy so as to change a pairing of a certain laser energy source with a certain laser energy pixel.

In some embodiments, laser energy may be redirected (e.g. the pairing of laser energy source and laser energy pixel may be changed) in response to the detection of a failure within the additive manufacturing system, such as a failure of a laser energy source, a failure of an optical fiber, a failure of a photonic lantern or other failure. While the previous example describes two laser energy sources and two laser energy pixels, it is envisioned that an additive manufacturing system may include any of laser energy sources and laser energy pixels. According to some embodiments, the photonic lanterns may be joined in series to form a cascade of photonic lanterns which may create a network of energy paths. In some embodiments of an additive manufacturing system, the network of energy paths may provide redundant energy paths to selectively connect a plurality of laser energy sources with the corresponding laser energy pixels such that the resulting system may be more resilient to failures. For instance, a first plurality of photonic lanterns may receive laser energy from a plurality of laser energy sources. Laser energy may be combined and/or directed within the first plurality of photonic lanterns. A second plurality of photonic lanterns may receive laser energy from the first plurality of photonic lanterns and combine and/or direct the laser energy such that laser energy may be output to a specific laser energy pixel. As expanded on further below, energy paths may combine and furcate at two or more levels of photonic lanterns to form a network where the photonic lanterns may serve as nodes of the network. Within the network, any loss of continuity within an energy path, such as by a failed optical fiber or photonic lantern, may be avoided by rerouting laser energy around the discontinuous portion of the network. In some embodiments, some laser energy sources and/or laser energy pixels may be held in reserve as spares, connected to the network of energy paths but unused except in the case that another component fails.

A photonic lantern may be operated under feedback control to achieve and/or maintain a desired output from the photonic lantern. A photonic lantern may be operated to change an energy path, beam intensity distribution, etc., by modulating at least one of an intensity or a phase of the laser energy input to the photonic lantern. An output or multiple outputs of a photonic lantern may be measured by a sensor or photodetector such as a photodiode, camera etc. The sensor may provide feedback to a controller including a processor which may adjust the intensity and/or phase of the energy input to the photonic lantern. This may include adjusting the intensity and/or phase of one or more laser energy sources. Feedback control may reduce the drift of a desired steady output such as may occur with changes in material properties and physical dimensions as a result of changes in temperature and other environmental conditions of components including the laser energy sources, optics, optical fibers, photonic lanterns and other components.

Photonic lanterns may offer a number of potential benefits relative to additive manufacturing systems and methods. For instance, photonic lanterns may be used to enhance controllability of a beam of laser energy. Photonic lanterns may direct the position of an emanating laser energy beam (e.g. beam steering), such as to allow a single laser beam to be adjusted for positional calibration or to selectively energize multiple locations such as for redundancy with nearby laser beams. Photonic lanterns may additionally alter an energy distribution within a laser beam incident on a surface, such as to create a non-gaussian intensity distribution. Non-gaussian intensity distributions may be desirable for controlling a melt pool/weld pool in additive manufacturing systems. In addition, photonic lanterns may combine, split, or direct laser energy with low losses. For example, the losses associated with a network of optical fiber paths and photonic lanterns may be lower than losses associated with functionally equivalent free space optics and free space optical paths. Reduced losses may further enhance reliability by reducing undesirable heating of components within the energy path. Photonic lanterns may also provide for rapid response in additive manufacturing applications. For example, in some applications, the response time of a photonic lantern may be in the range of microseconds to milliseconds allowing for transmission of energy at frequencies on the order of tens of kilohertz. Photonic lantern response times may be advantageous over repositioning free-space optics, galvo mirrors, mechanical switching and similar alternatives.

As used herein, the term "upstream" may refer to a first location along an energy path that is closer to a laser energy source supplying laser energy to that energy path than a second location such that laser energy from the laser energy source will encounter the first (e.g., upstream) location before that same laser energy encounters the second location. As used herein, the term "downstream" may refer to a second location on an energy path wherein that second location is farther from the laser energy source supplying that energy path than a first location on the same energy path such that laser energy from the laser energy source will encounter the second (e.g., downstream) location after that same laser energy has encountered the first (e.g. upstream) location.

Laser energy sources, such as a plurality of laser energy sources, at an upstream end of an energy path may be optically coupled to one or more pluralities of photonic lanterns by a plurality of optical fibers. Optical fibers may be multimode optical fibers, single mode optical fibers, or a combination of single mode and multimode optical fibers. According to some embodiments, an energy path may include a multimode fiber and one or more single mode fibers. Transitions between single mode and multimode fibers may occur within a photonic lantern. For instance, a photonic lantern may have n single mode fibers as inputs and one n-mode multimode fiber as an output, where the photonic lantern combines laser energy from the n single mode fiber within the lantern. Alternatively, a photonic lantern may have one m-mode multimode fiber as an input and m single mode fibers as outputs. Laser energy may be conveyed to an optics assembly by a single mode optical fiber or a multimode optical fiber. The laser energy delivered to the optics head by a given optical fiber may have originated from more than one laser energy source in some embodiments. In some embodiments, there may not be perfect n to n and/or m to m mapping. A photonic lantern may include slightly more or slightly fewer input modes to output modes, such as may depend on manufacturing techniques and/or other considerations such as may be encountered in practical applications.

Beams of laser energy may be coherently combined to create a plurality of laser pixels on the build surface. In coherent combination two or more laser energy beams may be combined to produce a single laser energy beam which may then form a single laser energy pixel on the build surface.

Laser energy pixels may also be created from multiple laser energy beams by constructive/destructive interference between interacting beams of laser energy. Constructive interference may result in an increase in intensity of two interacting beams of laser energy. Destructive interference may attenuate energy by the interaction of multiple beams of laser energy. Interference, such as between neighboring beams of laser energy, may produce local maxima and minima in light intensity at the build surface. By coherently controlling neighboring beams of laser energy such as a small, continuous group of photonic lantern outputs, a light intensity pattern can be generated so as to produce spots of locally greater intensity resulting from constructive interference. These spots of locally greater intensity may form laser energy pixels in some embodiments. Forming laser pixels by constructive interference may offer benefits such as benefits to controllability and redundancy as will be discussed further in this disclosure. However, embodiments in which separate laser energy pixels without any overlap between the laser energy pixels and there is no interference between the corresponding laser beams are also contemplated.

In some embodiments, incident laser spots on a build surface may be arranged in a line with a long dimension and a short dimension, or in an array. In either case, according to some aspects, a line, or array, of incident laser energy may include multiple individual laser energy pixels arranged adjacent to each other that can have their respective power levels individually controlled. Each laser energy pixel may be turned on or turned off independently and the power of each pixel can be independently controlled. The resulting pixel-based line or array of laser pixels may then be scanned across a build surface to form a desired pattern thereon by controlling the individual pixels during translation of the optics assembly.

Depending on the particular embodiment, an additive manufacturing system according to the current disclosure may include any suitable number of laser energy sources. For example, in some embodiments, the number of laser energy sources may be at least 5, at least 10, at least 50, at least 100, at least 500, at least 1,000, at least 1,500, or more. In some embodiments, the number of laser energy sources may be less than 2,000, less than 1,500, less than 1,000, less than 500, less than 100, less than 50, or less than 10. Additionally, combinations of the above-noted ranges may be suitable. Ranges both greater and less than those noted above are also contemplated as the disclosure is not so limited.

Additionally, in some embodiments, a power output of a laser energy source (e.g., a laser energy source of a plurality of laser energy sources) may be between about 50 W and about 5,000 W (5 KW). For example, the power output for each laser energy source may be between about 100 W and about 1.5 kW, and/or between about 500 W and about 1 kW. Further, a laser power input to and/or an output from a photonic lantern may be configured to be between about 50 W and about 5000 W (5 KW), or more preferably between about 100 W and about 5000 W (5 KW). Moreover, a total power output of the plurality of laser energy sources may be between about 500 W (0.5 kW) and about 4,000 kW. For example, the total power output may be between about 1 kW and about 2,000 kW, and/or between about 100 kW and about 1,000 kW. Ranges both greater and less than those noted above are also contemplated as the disclosure is not so limited.

Depending on the embodiment, an array of laser energy pixels (e.g., a line array or a two dimensional array) may have a uniform power density along one or more axes of the array including, for example, along the length dimension (i.e. the longer dimension) of a line array. In other instances, an array can have a non-uniform power density along either of the axes of the array by setting different power output levels for each pixel's associated laser energy source. Moreover, individual pixels on the exterior portions of the array can be selectively turned off or on to produce an array with a shorter length and/or width. In some embodiments, the power levels of the various pixels in an array of laser energy may be independently controlled throughout an additive manufacturing process. For example, the various pixels may be selectively turned off, on, or operated at an intermediate power level to provide a desired power density within different portions of the array.

According to some embodiments, a line array of laser energy pixels may be a linear array of laser energy pixels. The linear array of laser pixels may be produced by laser energy emanating from a corresponding linear array of energy paths. The linear array of laser energy pixels may include at least 10 laser energy pixels. The linear array of energy paths may be a linear array of optical fiber paths where each optical fiber may carry the energy corresponding to a single laser energy pixel. For example, the number of laser energy pixels within the linear array of laser energy pixels may equal to the number of laser energy sources. In some embodiments, laser energy pixels may be formed by the coherent combination or constructive interference of multiple laser energy streams emanating from different energy paths. The number of laser energy pixels may be fewer than the number of laser energy sources, for instance, the number of laser energy pixels may be two fewer than the number of laser energy sources. The energy in a laser energy pixel may be greater than, less than, approximately equal to or equal to the laser energy conveyed by a single energy path within an array of optical fiber paths. In some embodiments, the number of laser energy pixels in the linear array of laser energy pixels may be greater than the number of laser energy sources. The linear array of laser energy pixels may be directed onto the build surface by an optics assembly.

Generally, laser energy produced by a laser energy source has a power area density. In some embodiments, the power area density of the laser energy transmitted through an optical fiber is greater than or equal to 0.1 W/micrometer$^2$, greater than or equal to 0.2 W/micrometer$^2$, greater than or equal to 0.5 W/micrometer$^2$, greater than or equal to 1 W/micrometer$^2$, greater than or equal to 1.5 W/micrometer$^2$, greater than or equal to 2 W/micrometer$^2$, or greater. In some embodiments, the power area density of the laser energy transmitted through the optical fiber is less than or equal to 3 W/micrometer$^2$, less than or equal to 2 W/micrometer$^2$, less than or equal to 1.5 W/micrometer$^2$, less than or equal to 1 W/micrometer$^2$, less than or equal to 0.5 W/micrometer$^2$, less than or equal to 0.2 W/micrometer$^2$, or less. Combinations of these ranges are possible. For example, in some embodiments, the power area density of the laser energy transmitted through the optical fiber is greater than or equal to 0.1 W/micrometer$^2$ and less than or equal to 3 W/micrometer$^2$.

Depending on the application, output of the optics assembly may be scanned across a build surface of an additive manufacturing system in any appropriate fashion. For example, in one embodiment, one or more galvo scanners may be associated with one or more laser energy sources to scan the resulting one or more laser pixels across the build surface. Alternatively, in other embodiments, an optics assembly may include an optics head that is associated with one or more appropriate actuators configured to translate the optics head in a direction parallel to a plane of the build surface to scan the one or more laser pixels across the build surface. In either case, it should be understood that the disclosed systems and methods are not limited to any particular construction for scanning the laser energy across a build surface of the additive manufacturing system.

For the sake of clarity, transmission of laser energy through an optical fiber is described generically throughout. However, with respect to various parameters such as transverse cross-sectional area, transverse dimension, transmission area, power area density, and/or any other appropriate parameters related to a portion of an optical fiber that the laser energy is transmitted through, it should be understood that these parameters refer to either a parameter related to a bare optical fiber and/or a portion of an optical fiber that the laser energy is actively transmitted through such as an optical fiber core, or a secondary optical laser energy transmitting cladding surrounding the core. In contrast, any surrounding cladding, coatings, or other materials that do not actively transmit the laser energy may not be included in the disclosed ranges.

It will be appreciated that any embodiments of the systems, components, methods, and/or programs disclosed herein, or any portion(s) thereof, may be used to form any part suitable for production using additive manufacturing. For example, a method for additively manufacturing one or more parts may, in addition to any other method steps disclosed herein, include the steps of selectively fusing one or more portions of a plurality of layers of precursor material deposited onto the build surface to form the one or more parts. This may be performed in a sequential manner where each layer of precursor material is deposited on the build surface and selected portions of the upper most layer of precursor material is fused to form the individual layers of the one or more parts. This process may be continued until the one or more parts are fully formed.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 shows, according to some embodiments, a schematic representation of an additive manufacturing system 100, including a plurality of laser energy sources 102 that deliver laser energy to an optics assembly 104 positioned within a machine enclosure 106. For example, the machine enclosure may define a build volume in which an additive manufacturing process may be carried out. In particular, the optics assembly may direct laser energy 108 towards a build surface 110 positioned within the machine enclosure to selectively fuse powdered material on the build surface. As described in more detail below, the optics assembly 104 may include a plurality of optics defining an optical path within the optics assembly that may transform, shape, and/or direct laser energy within the optics assembly such that the laser energy is directed onto the build surface as an array of laser energy pixels. In some embodiments, the optics assembly may be movable within machine enclosure 106 to scan laser energy 108 across build surface 110 during a manufacturing process. For example, the optics assembly may be associated with appropriate actuators, rails, motors, and/or any other appropriate structure capable of optics assembly relative to the surface. Alternatively, embodiments in which the optics assembly includes galvomirrors or other appropriate components that are configured to scan the laser energy 108 across the build surface while the optics assembly is held stationary relative to the build surface are also contemplated.

In some embodiments, the additive manufacturing system 100 further includes one or more optical fiber connectors 112 positioned between the laser energy sources 102 and the optics assembly 104. As illustrated, a first plurality of optical fibers 114 may extend between the plurality of laser energy sources 102 and the optical fiber connector 112. In particular, each laser energy source 102 may be coupled to the optical fiber connector 112 via a respective optical fiber 116 of the first plurality of optical fibers 114. Similarly, a second plurality of optical fibers 118 extends between the optical fiber connector 112 and the optics assembly 104. Each optical fiber 116 of the first plurality of optical fibers 114 is coupled to a corresponding optical fiber 120 of the second plurality of optical fibers 118 within the optical fiber connector. In this manner, laser energy from each of the laser energy sources 102 is delivered to the optics assembly 104 such that laser energy 108 can be directed onto the build surface 110 during an additive manufacturing process (i.e., a build process). Of course other methods of connecting the laser energy sources 100 due to the optics assembly 104 are also contemplated.

Figure 2:
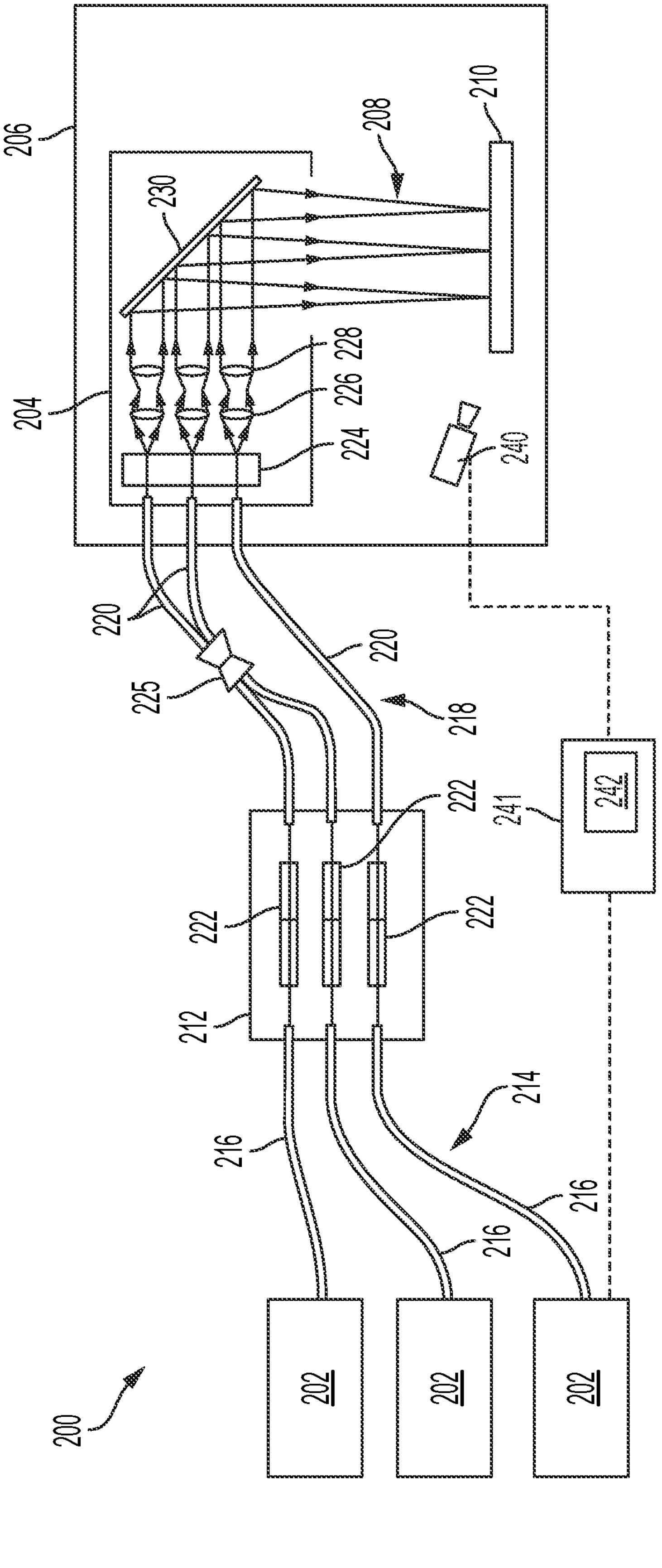
FIG. 2 shows a schematic representation of another embodiment of an additive manufacturing system.

FIG. 2 shows a schematic representation of another embodiment of an additive manufacturing system 200. Similar to the embodiment discussed above in connection with FIG. 1, the additive manufacturing system 200 includes a plurality of laser energy sources 202 coupled to the optics assembly 204 within the machine enclosure 206 via the optical fiber connector 212. The first plurality of optical fibers 214 extends between the laser energy sources 202 and the optical fiber connector 212, and the second plurality of optical fibers 218 extends between the optical fiber connector 212 and optics assembly 204. In particular, each optical fiber 216 of the first plurality of optical fibers is coupled to a laser energy source 202 and corresponding optical fiber 220 of the second plurality of optical fibers 218. In the depicted embodiment, optical fibers 216 are coupled to corresponding optical fibers 220 via fusion splices 222 within the optical fiber connector 212. However, embodiments, in which the optical fibers positioned within the connector are optically coupled using other types of connections and/or single continuous optical fibers are used are also envisioned.

In the depicted embodiment, the optical fibers 220 of the second plurality of optical fibers 218 are optically coupled to an optics assembly 204 of the system. For example, an alignment fixture 224 is configured to define a desired spatial distribution of the optical fibers used to direct laser energy into the optics assembly. For example, the alignment fixture may comprise a block having a plurality of v-grooves or holes in which the optical fibers may be positioned and coupled to in order to accurately position the optical fibers within the system.

FIG. 2 also depicts exemplary optics that may be optically coupled to and positioned along the energy paths extending between the laser energy sources 202 and the build surface 210. The various optics included in the optics assembly may be configured to direct laser energy 208 from the second plurality of optical fibers 218 on the build surface 210 to form a desired array pattern of laser energy pixels on the build surface. For example, the optics assembly may include beam forming optics such as lenses 226 and 228 (which may be individual lenses, lens arrays, and/or combined macrolenses), mirrors 230, and/or any other appropriate type of optics disposed along the various energy paths between the optical fibers and the build surface 210 which may shape and direct the laser energy within the optics assembly. Once appropriately sized and shaped, the laser energy 208 may be directed onto the build surface 210 either through direct transmission and/or using a light directing element such as the depicted mirror 230.

FIG. 2 additionally illustrates how the plurality of energy paths extending between the plurality of laser energy sources 202 and the build surface 210 may include one or more, or a plurality of photonic lanterns 225, disposed along one or more energy paths corresponding to the depicted optical fibers 220. The plurality of photonic lanterns may provide for switching of laser energy between the energy paths 220 connected by the photonic lantern 225. The photonic lantern 225 is illustrated within the energy path for exemplary purposes only and may not represent the interconnection of the plurality photonic lanterns in all embodiments. For clarity fewer energy paths and photonic lanterns are illustrated than are envisioned. Other embodiments of energy paths including a plurality of photonic lantern are described in further detail below.

The photonic lanterns may benefit from the use of a feedback signal to maintain the desired optical intensity distribution, locations, and/or beam shapes on the build surface. For example, system movement (bending, stretching, compression, vibration) of the fibers, lanterns, lasers amplifiers etc. may cause changes in phase. Thermal changes in the system, along with optical and electrical noise, and nonlinear optical processes in the optical fibers may also cause the optical output of a photonic lantern to shift over time. Thus, one or more sensors may be configured to detect one or more properties associated with the laser energy pixels emitted onto the build surface. For example, in some embodiments, each laser energy pixel on the build surface may have a single pixel photodetector configured to measure the properties associated with the corresponding pixel (e.g., location, intensity, etc.). In a system with many pixels, it may be desirable to use a photosensitive detector that is configured to measure properties using a one dimensional and/or two dimensional array of pixels (e.g., a linear camera, a two dimensional camera, or other appropriate optical sensor). Additional apertures and optics may be included in such a sensing arrangement.

In view of the above, in some embodiments, the photonic lanterns in a system may be controlled by changing operation (e.g., a phase, intensity, and/or other appropriate parameter) of the associated laser energy sources 202 based at least in part on feedback from one or more sensors 240 configured to sense one or more parameters associated with outputs of the plurality of photonic lanterns (e.g., the laser energy pixels). Sensor 240 may be a photo diode configured to monitor the output of the energy path and provide data to a controller 241 including a processor 242. Additional sensors may be included. A camera as illustrated, may additionally monitor weld quality of one or more laser pixels on a build surface and may provide additional data as feedback as an input to the controller for the controller to adjust the laser energy sources. The controller may modulate phase and intensity of the laser energy sources to produce a desired output at the laser pixel on the build surface.

Figure 3:
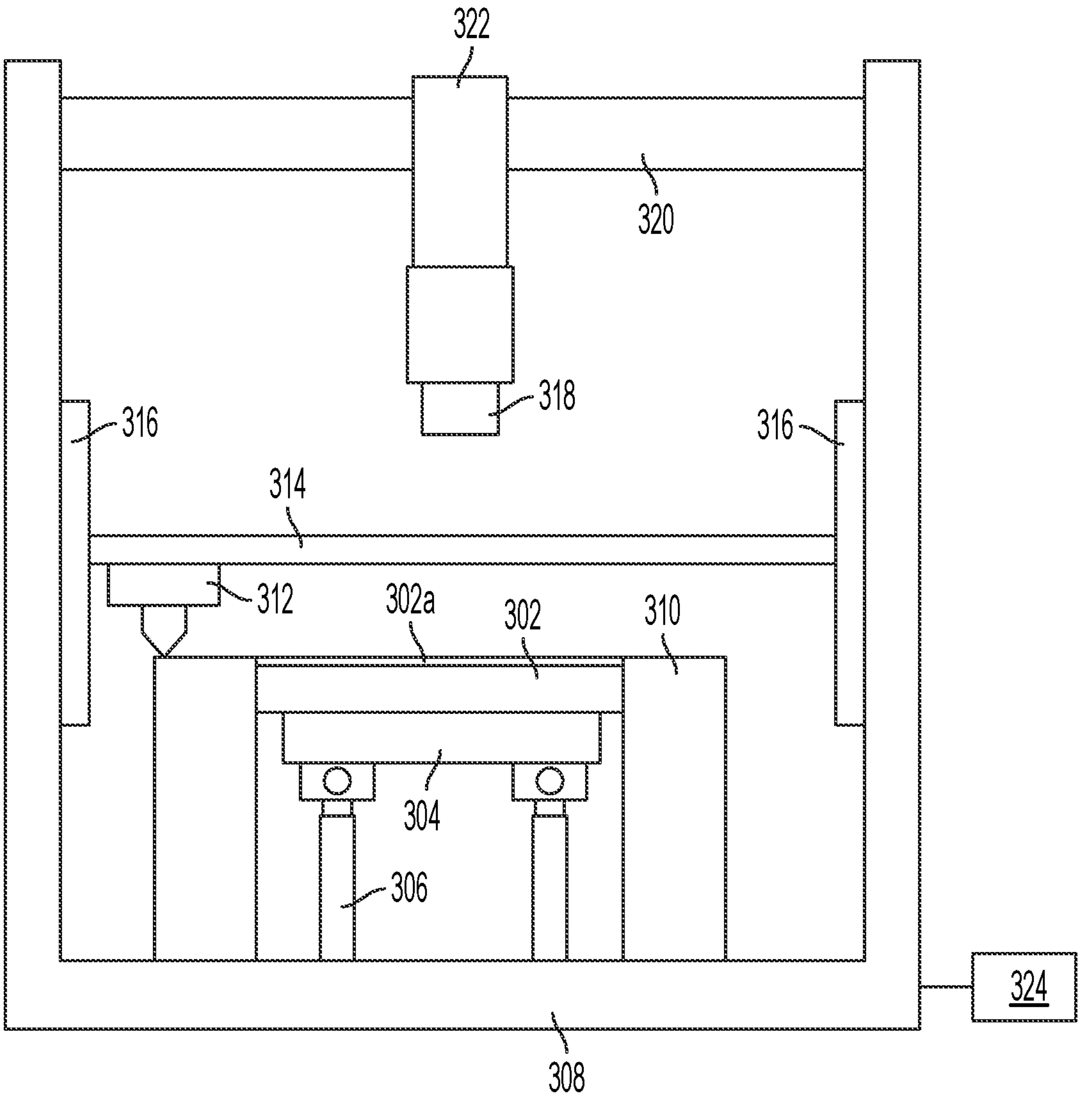
FIG. 3 shows one embodiment of an additive manufacturing system at the beginning of a build process.

FIG. 3 depicts one embodiment of an additive manufacturing system at the beginning of a build process. The additive manufacturing system includes a build plate 302 mounted on a fixed plate 304, which is in turn mounted on one or more vertical supports 306 that attach to a base 308 of the additive manufacturing system. In the depicted embodiment, the one or more vertical supports may correspond to one, two, and/or any other appropriate number of supports configured to support the build plate, and the corresponding build surface, at a desired position and orientation. For example, the supports depicted in the figure may correspond to one or more vertical motion stages configured to control a vertical position and orientation of the build plate. A powder containment shroud 310 may at least partially, and in some embodiments completely, surround a perimeter of the build plate 302 to support a volume of precursor material 302*a*, such as a volume of powder, disposed on the build plate and contained within the shroud. The shroud may be supported on the base 308 or by any other appropriate portion of the system.

The additive manufacturing system may include a powder deposition system in the form of a recoater 312 that is mounted on a horizontal motion stage 314 that allows the recoater to be moved back and forth across either a portion, or entire, surface of the build plate 302. As the recoater traversers the build surface of the build plate, it deposits a precursor material 302*a*, such as a powder, onto the build plate and smooths the surface to provide a layer of precursor material with a predetermined thickness on top of the underlying volume of fused and/or unfused precursor material deposited during prior formation steps.

In some embodiments, the supports 306 of the build plate 302 may be used to index the build surface of the build plate 302 in a vertical downwards direction relative to a local direction of gravity. In such an embodiment, the recoater 312 may be held vertically stationary for dispensing precursor material 302*a*, such as a precursor powder, onto the exposed build surface of the build plate as the recoater is moved across the build plate each time the build plate is indexed downwards.

In some embodiments, the additive manufacturing system may also include an optics assembly 318 that is supported vertically above and oriented towards the build plate 302. As detailed above, the optics assembly may be optically coupled to one or more laser energy sources, not depicted, to direct laser energy in the form or one or more laser energy pixels onto the build surface of the build plate 302. To facilitate movement of the laser energy pixels across the build surface, the optics assembly may be configured to move in one, two, or any number of directions in a plane parallel to the build surface of the build plate. To provide this functionality, the optics assembly may be mounted on a gantry 320, or other actuated structure, that allows the optics unit to be scanned in plane parallel to the build surface of the build plate.

In the above embodiment, the build plate is indexed vertically while the remaining active portions of the system are held vertically stationary. However, embodiments, in which the build plate is held vertically stationary and the shroud 310, recoater 312, and optics assembly 318 are indexed vertically upwards relative to a local direction of gravity during formation of successive layers are also contemplated. In such an embodiment, the recoater horizontal motion stage 314 may be supported by vertical motion stages 316 that are configured to provide vertical movement of the recoater relative to the build plate. Corresponding vertical motion stages may also be provided for the shroud 310, not depicted, to index the shroud vertically upward relative to the build plate in such an embodiment. In some embodiments, the additive manufacturing system may also include an optics assembly 318 that is supported on a vertical motion stage 320 that is in turn mounted on the gantry 320 that allows the optics unit to be scanned in the plane of the build plate 302.

In the above embodiment, the vertical motion stages, horizontal motion stages, and gantry may correspond to any appropriate type of system that is configured to provide the desired vertical and/or horizontal motion. This may include supporting structures such as: rails; linear bearings, wheels, threaded shafts, and/or any other appropriate structure capable of supporting the various components during the desired movement. Movement of the components may also be provided using any appropriate type of actuator including, but not limited to, electric motors, stepper motors, hydraulic actuators, pneumatic actuators, electric actuators, and/or any other appropriate type of actuator as the disclosure is not so limited.

In addition to the above, in some embodiments, the depicted additive manufacturing system may include one or more controllers 324 that is operatively coupled to the various actively controlled components of the additive manufacturing system. For example, the one or more controllers may be operatively coupled to the one or more supports 306, recoater 312, optics assembly 318, the various motion stages, and/or any other appropriate component of the system. In some embodiments, the controller may include one or more processors and associated non-transitory computer readable memory. The non-transitory computer readable memory may include processor executable instructions that when executed by the one or more processors cause the additive manufacturing system to perform any of the methods disclosed herein.

Figure 4:
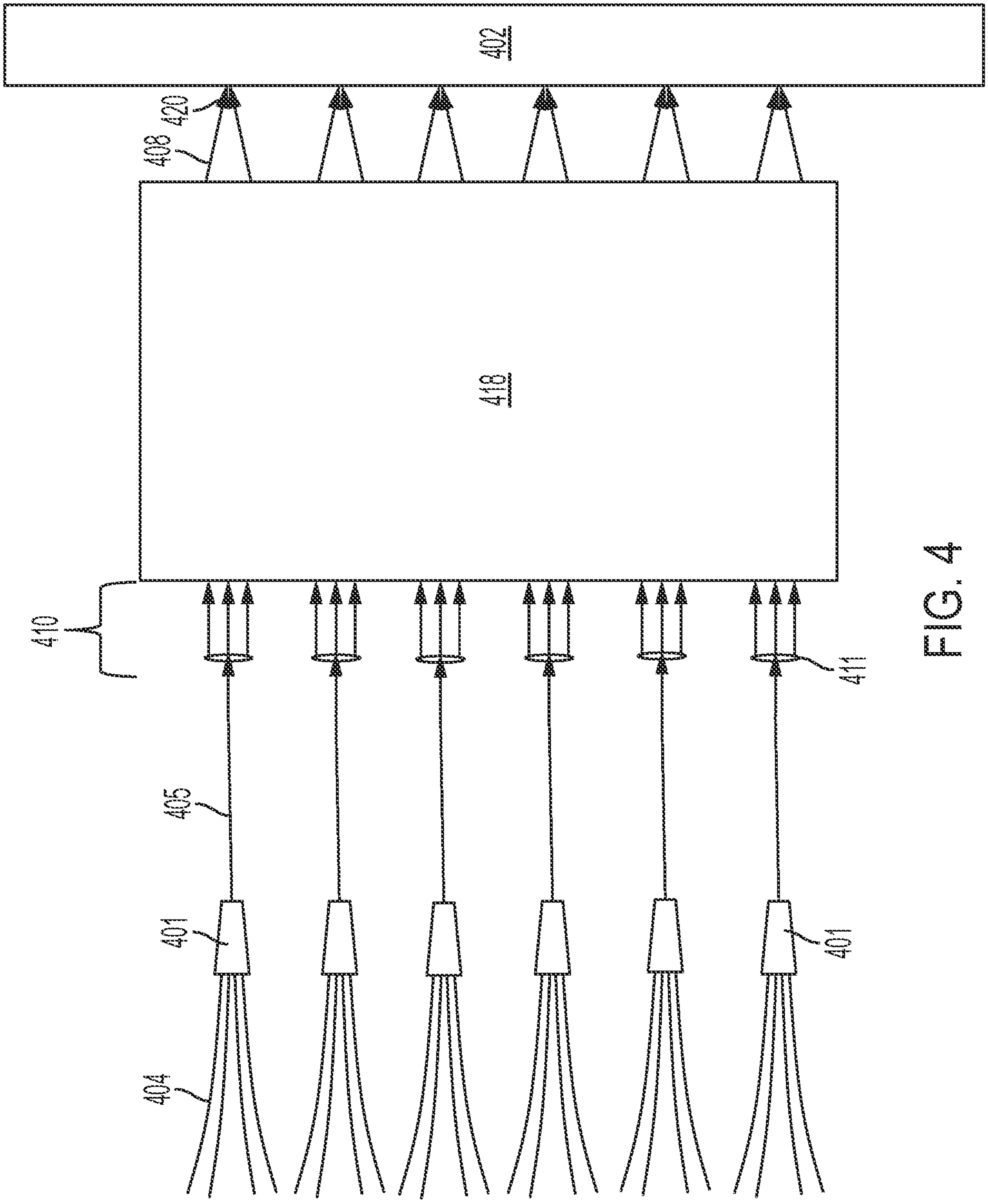
FIG. 4 shows a downstream end of energy paths of an additive manufacturing system according to one embodiment.

FIG. 4 depicts a downstream portion of a plurality of energy paths of an additive manufacturing system according to one embodiment. In the depicted embodiment, a plurality of photonic lanterns 401 combine laser energy from a plurality of first optical fibers 404 to a plurality of second optical fibers 405. In the illustrated embodiment, each photonic lantern 401 combines a plurality of first stage optical fibers 404 to a single second stage optical fiber 405 that extends downstream from the photonic lanterns. The first stage fibers may be single mode optical fibers. The second stage optical fiber may be a multimode optical fiber, such as a four mode, or other appropriate multimode, optical fiber. Other numbers and combinations are contemplated as this disclosure is not to be so limited. The plurality of photonic lanterns includes six photonic lanterns as illustrated however other numbers of photonic lanterns, including greater and lesser numbers of photonic lanterns are contemplated. An array of microlenses 410, and/or other optical components, may be located downstream from the second optical fibers 405 and immediately upstream of an optics assembly 418. Each microlens 411 in the microlens array 410 receives laser energy from a single second optical fiber 405. The optics assembly 418, such as optics assembly 318 illustrated in FIG. 3, directs laser energy onto a build surface 402. Focused laser energy 408, such as a focused beam of laser energy, leaves the optics assembly 418 and is directed onto the build surface to form a laser energy pixel 420 on the build surface 402. As depicted, six laser energy pixels are formed on the build surface 402, although it should be appreciated that any number of laser energy pixels including greater and lesser numbers of laser energy pixels may be formed. The laser energy pixels form a linear array of laser energy pixels and/or any other desired arrangement of laser energy pixels on the build surface. A discussed previously, one or more sensors may be used to monitor an intensity, a position, a phase, a distribution, and/or other appropriate characteristics of the resulting laser energy pixels.

The optics assembly 418 or other suitable portion of the energy path may contain additional optical components including mirrors (see FIG. 2), lenses, and/or other optics. The optics assembly may collimate the laser energy. According to some embodiments, the laser energy as delivered to the optics assembly may have differing divergence in orthogonal directions such as may tend to produce an oval rather than a circular beam. The optics assembly 418 may alter the divergence, such as to form a circular spot of laser energy on the build surface or to produce other intensity distributions. Collimation optics may include cylindrical lenses, including orthogonally positioned cylindrical lens pairs, fast axis collimators/slow axis collimators (e.g., FAC/SAC optics), aspheric lenses, or other optics. Each laser energy pixel may have its own optical train/lenses. In some embodiments, the array of microlenses 410, including a linear array of microlenses, may be housed within the optics assembly 418. The laser energy may leave the optics assembly 418 collimated, or the laser energy may be focused (as in the illustration of focused laser energy 408), or diverging (see also FIGS. 10A and 11A).

Figure 5:
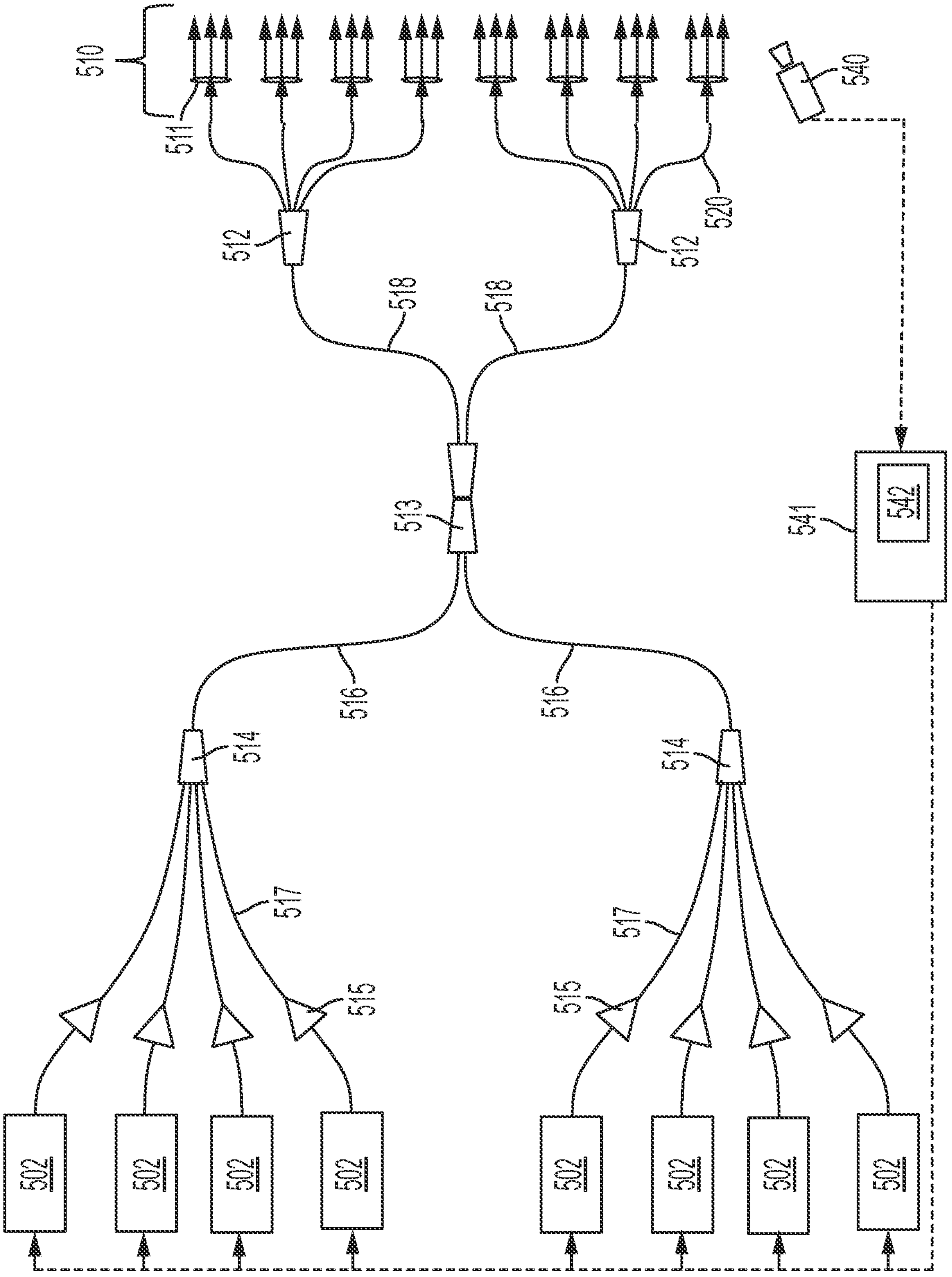
FIG. 5 shows energy paths in an additive manufacturing system according to one embodiment.

FIG. 5 depicts a plurality of laser energy paths in an additive manufacturing system according to one embodiment. The energy paths optically couple a plurality of laser energy sources 502 to a microlens array 510. In the depicted embodiment, each laser energy source 502 is optically coupled to a first stage optical fiber 517. A fiber amplifier 515 is located in line with each first stage optical fiber 517. A downstream end portion of each first stage optical fiber is optically coupled to a photonic lantern that is one of a first plurality of photonic lanterns 514 such that separate groups of first stage optical fibers are connected to separate photonic lanterns of the first plurality of photonic lanterns. A second stage optical fiber 516, of a second plurality of optical fibers, may optically couples a downstream end portion of each photonic lantern of the first plurality of photonic lanterns 514 with an upstream end portion of one or more downstream photonic lanterns. This may include connection to one of a second plurality of photonic lanterns 513 (only one of the second plurality of photonic lanterns is shown). A plurality of third stage optical fibers 518 may optically couple a downstream end portion of each photonic lantern of the one or more second photonic lanterns 513 to an upstream end portion of two or more of a third plurality of photonic lanterns 512. The third plurality of photonic lanterns 512 may furcate into a plurality of fourth stage optical fibers 520 extend downstream from the third plurality of photonic lanterns where the fourth stage optical fibers may be optically coupled with appropriate optics such as the depicted array of microlenses 510 located downstream of the fourth stage optical fiber 520

In the depicted embodiment, optical fibers convey laser energy from the plurality of laser energy sources 502 to the microlens array 510. The first stage optical fiber 517 conveys laser energy from a single laser energy source and may be a single mode optical fiber in some embodiments. The first plurality of photonic lanterns 514 combine laser energy from multiple first stage optical fibers and direct the combined laser energy to the separate second stage optical fiber 516 extending downstream from an associated photonic lantern of the first plurality of photonic lanterns. The separate second stage optical fibers 516 convey the combined laser energy from multiple laser energy sources, such as four laser energy sources as illustrated. The second stage optical fibers 516 may be multi-mode optical fibers. In the illustrated embodiment the second stage optical fibers may be four mode optical fibers, and the second stage optical fibers may be optically coupled to one or more downstream second photonic lanterns 513 where multiple second stage optical fibers are connected to an upstream portion of each photonic lantern of the one or more second photonic lanterns. Laser energy from the second stage optical fibers 516 are combined by the second photonic lantern or the second plurality of photonic lanterns 513 (only one visible) and directed to the third stage optical fibers 518 extending downstream from each of the one or more second photonic lanterns. The third stage optical fibers may be multi-mode optical fibers. The fourth stage optical fibers 520 which are optically coupled to the downstream end portions of the third plurality of photonic lanterns may be single mode optical fibers.

As illustrated in FIG. 5, the plurality of laser energy sources, photonic lanterns, and energy paths may be used to form a plurality of laser energy pixels. Of course, while specific numbers and arrangements of energy paths, laser energy sources, and photonic lanterns are illustrated, other numbers and arrangements of these components are contemplated as this disclosure is not so limiting.

As previously described, feedback control may be used in the operation of the laser energy sources and photonic lanterns. Thus, an appropriate sensor 540 may be included in the system. The sensor may provide data related to one or more parameters of the laser energy pixels to a controller 541 including a processor 542 which may use the data received from the sensor to adjust an output of one or more laser energy sources 502, for example adjusting the intensity and/or phase of one or more laser energy sources to control or refine the measured output of the pixel.

Figure 6:
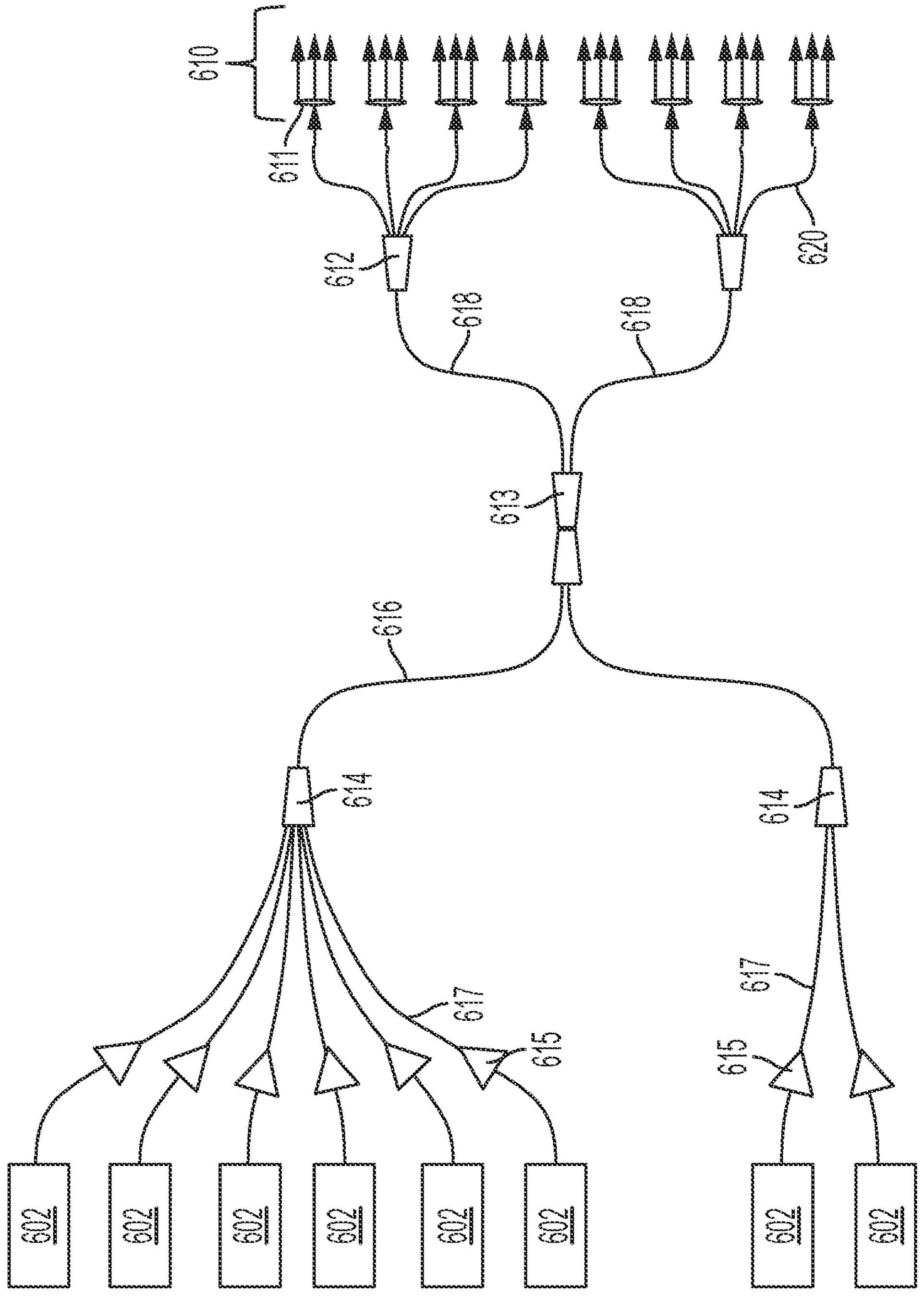
FIG. 6 shows energy paths for an additive manufacturing system according to another embodiment.

FIG. 6 depicts energy paths for an additive manufacturing system according to another embodiment. The energy paths optically couple a plurality of laser energy sources 602 to a microlens array 610, or other appropriate optics. The embodiment of FIG. 6 shows an arrangement of a plurality of laser energy sources 602, a plurality of first stage optical fibers 602, a first plurality of photonic lanterns 614, a plurality of second stage optical fibers 616, one or more second photonic lanterns 613, a plurality of third stage optical fibers 618, a third plurality of photonic lanterns 612, and a plurality of fourth stage optical fibers 620 that are arranged and coupled in a similar manner to that depicted above relative to FIG. 6. However, while FIG. 5 illustrates symmetric branching of the energy paths, FIG. 6 illustrates asymmetric branching of the energy paths. For instance, as shown one of the first plurality of photonic lanterns 614 combines laser energy from six first stage optical fibers 617 while another of the first plurality of photonic lanterns combines laser energy from two optical fibers. Thus, the photonic lanterns with a particular stage may either combine the same number or different numbers of inputs from corresponding optical fibers. Correspondingly, the number of outputs from the downstream portions of the photonic lanterns may either by the same or different. The numbers shown are for illustrative purposes only and should not be considered limiting. Asymmetric branching may be desirable for creating redundancy within networks of energy paths as well as in situations where a number of components such as laser energy sources or laser energy pixels may not easily provide for equal branching. In some situations, it may be advantageous to create lanterns with smaller numbers of fibers. Lanterns including a smaller number of fibers may transmit laser energy with lower energy losses.

Figure 7:
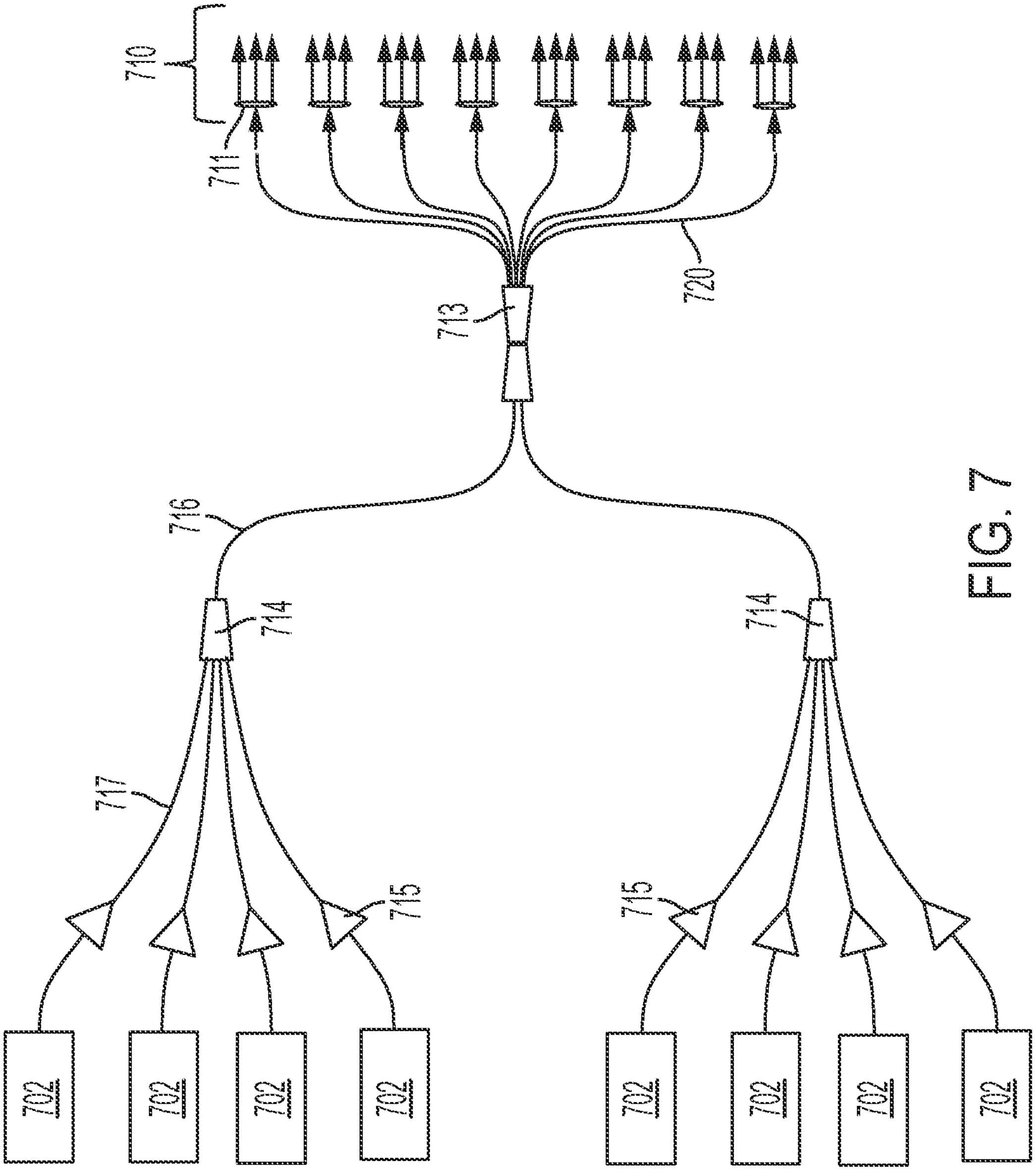
FIG. 7 shows energy paths within an additive manufacturing system according to some embodiments.

FIG. 7 illustrates energy paths within an additive manufacturing system according to some embodiments including photonic lanterns with different numbers of furcations/combinations in the upstream and downstream directions. The energy paths optically couple a plurality of laser energy sources 702 to a microlens array 710 or other appropriate optics for directing the laser energy onto a build surface, not depicted, to form a plurality of laser energy pixels thereon. Similar to the above, separate optical fibers of a plurality of first stage optical fibers 717 are optically coupled to separate laser energy sources 702 of a plurality of laser energy sources. A fiber amplifier 715 is located in line with each first stage optical fiber 717. A downstream end portion of the first stage optical fibers are optically coupled to a photonic lantern of a first plurality of photonic lanterns 714. In the depicted embodiment, separate groups of first stage optical fibers are optically coupled with upstream portions of separate photonic lanterns of the plurality of photonic lanterns. A separate second stage optical fiber 716 may be optically coupled to a downstream portion of each one of the first plurality of photonic lanterns 714 and with an upstream portion of a second set of one or more photonic lanterns 713. While only one second set of photonic lanterns is depicted with all of the second stage optical fibers connected to it is depicted in the figure, the use of a second plurality of photonic lanterns where separate groups of second stage optical fibers are connected to separate ones of the second plurality of photonic lanterns is also contemplated. Thus, a plurality of second stage optical fibers may be optically coupled to the first plurality of photonic lanterns downstream of the first plurality of photonic lanterns and optically coupled to the second plurality of photonic lanterns at an upstream end of the second plurality of photonic lanterns. A plurality of third stage optical fibers 720 may be optically coupled to a downstream end portion of the one of more second photonic lanterns 713 and to the downstream array of microlenses 710 or other optics. In the depicted embodiment, the first stage optical fibers 717 and the third stage optical fibers 720 may be single mode optical fibers and the second stage optical fibers 716 may be multimode optical fibers.

Figure 8:
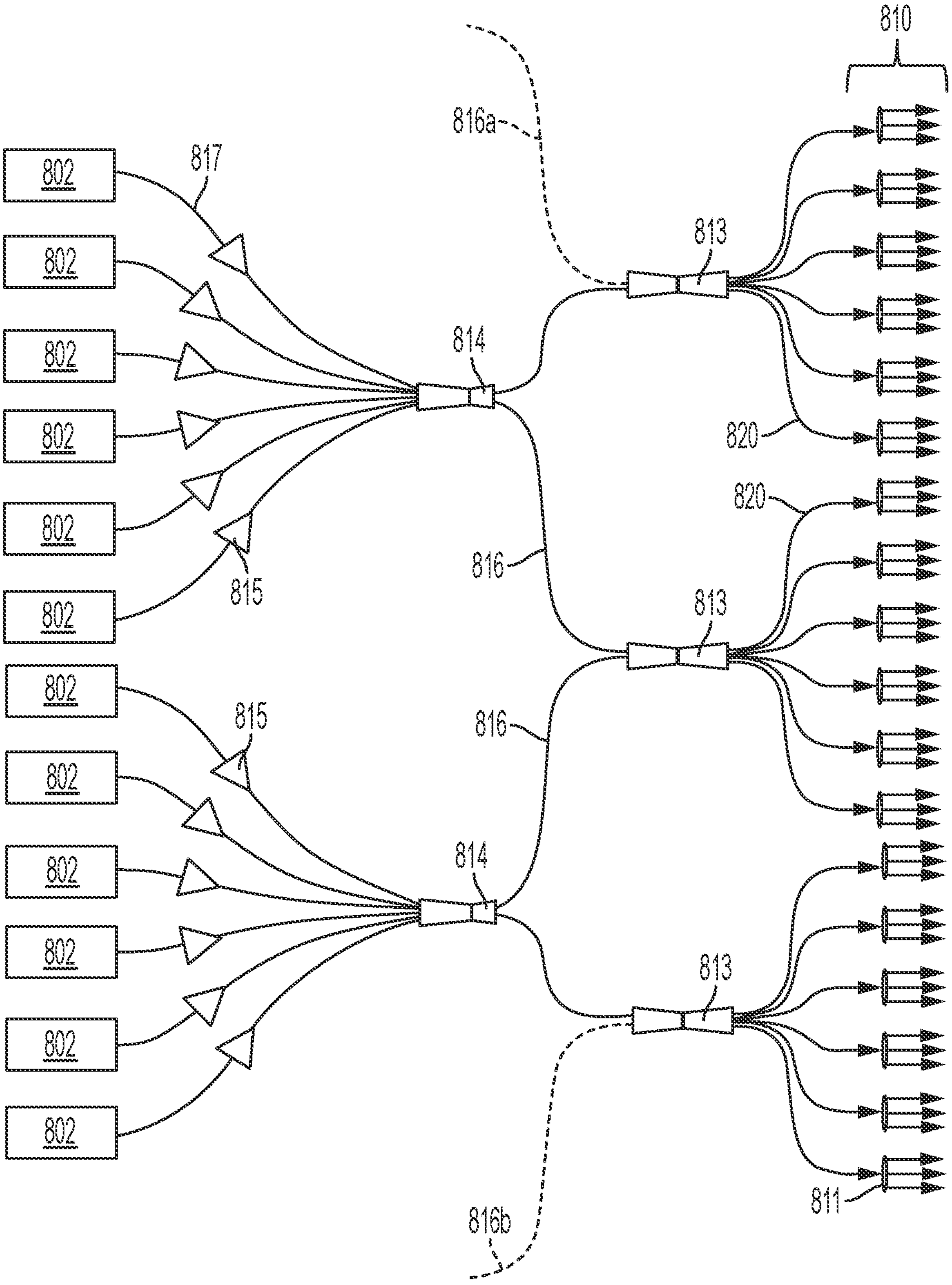
FIG. 8 shows a portion of a network of energy paths within an additive manufacturing system according to some embodiments.

FIG. 8 depicts a portion of a network of energy paths within an additive manufacturing system according to some embodiments. The network of energy paths optically couples a plurality of laser energy sources 802 to a microlens array 810 or other appropriate optics for directing the laser energy onto a build surface, not depicted, to form a plurality of laser energy pixels thereon. Similar to the above, separate optical fibers of a plurality of first stage optical fibers 817 are optically coupled to separate laser energy sources 802 of a plurality of laser energy sources. A fiber amplifier 815 is located in line with each first stage optical fiber 817. In the depicted embodiment, downstream end portions of separate groups of first stage optical fibers 817 are optically coupled with upstream end portions of a set of photonic lanterns of the first plurality of photonic lanterns 814. A separate second stage optical fiber 816 may be optically coupled to a downstream end portion of each set of the first plurality of photonic lanterns 814 and with an upstream portion of a set of photonic lanterns of a second plurality photonic lanterns 813. While the second plurality of photonic lanterns only is depicted to include three sets of photonic lanterns 813, other numbers of photonic lantern sets are contemplated for the second plurality of photonic lanterns. Separate second stage fibers 816*a* and 816*b* are optically coupled to photonic lanterns (not illustrated) of the first plurality of photonic lanterns 814. A plurality of second stage optical fibers 816 are optically coupled with the first plurality of photonic lanterns at a downstream end portion of the first plurality of photonic lanterns and optically coupled with the second plurality of photonic lanterns at an upstream end portion of the second plurality of photonic lanterns. In the depicted embodiment, separate groups of third stage optical fibers 820 are optically coupled with the second plurality of photonic lanterns 813 at a downstream end portion of the second plurality of photonic lanterns. Each one of the third stage optical fibers 820 optically couples a downstream end portion of the one of the second plurality of photonic lanterns 813 to a single microlens 811 of the array of microlenses 810. Each microlens 811 of the microlens array 810 therefore receives laser energy emitted from a single third stage optical fiber 820. In the depicted embodiment, the first stage optical fibers 817 and the third stage optical fibers 820 may be single mode optical fibers and the second stage optical fibers 816 may be multimode optical fibers. As indicated by second stage optical fibers 816*a* and 816*b*, the illustration depicts only a portion of the contemplated energy paths and additional energy paths, not shown, may be present. The energy paths illustrated in FIG. 8 represent a network of energy paths where laser energy may be directed to follow any number of possible energy paths between a given laser energy source and a given laser energy pixel.

The network of energy paths illustrated in FIG. 8 provides an example of the redundancy which may be built into networks of energy paths. For instance, should any one of the plurality of laser energy sources 802 fail, laser energy from another laser energy source of the plurality of laser energy sources may be redirected to any laser energy pixel, such as a laser energy pixel originally receiving laser energy from the failed laser energy source. A photonic lantern may switch the path of laser energy from one or multiple laser energy sources passing through the photonic lantern to provide energy to the laser energy pixel associated with the failed laser energy source without changing any physical connections of the optical fibers within the network of energy paths. In some instances this may include controlling a phase and/or intensity of one or multiple laser energy sources to provide the desired control over the network of energy paths. Should an intermediate element of the network fail, the photonic lanterns may redirect laser energy around the failed element and reduce the impact of the failure on the overall system. For instance, should a second stage optical fiber 816 fail, a photonic lantern of the second plurality of photonic lanterns that is coupled to the downstream end portion of the failed second stage optical fiber may receive laser energy from another second stage optical fiber optically coupled with the upstream end portion of the affected photonic lantern. The photonic lantern, receiving laser energy from a single second stage optical fiber, may continue to operate. This may enable an additive manufacturing process to continue operation in spite a failure of one or more first or second stage optical fibers as well as failure of one or more laser energy sources. In such a situation, the duty cycle of the laser energy pixel(s) downstream of the failed component (e.g., the failed second stage optical fiber in this example) may be affected. In this example, the print time may be lengthened to compensate for the reduced duty cycle.

Figure 9:
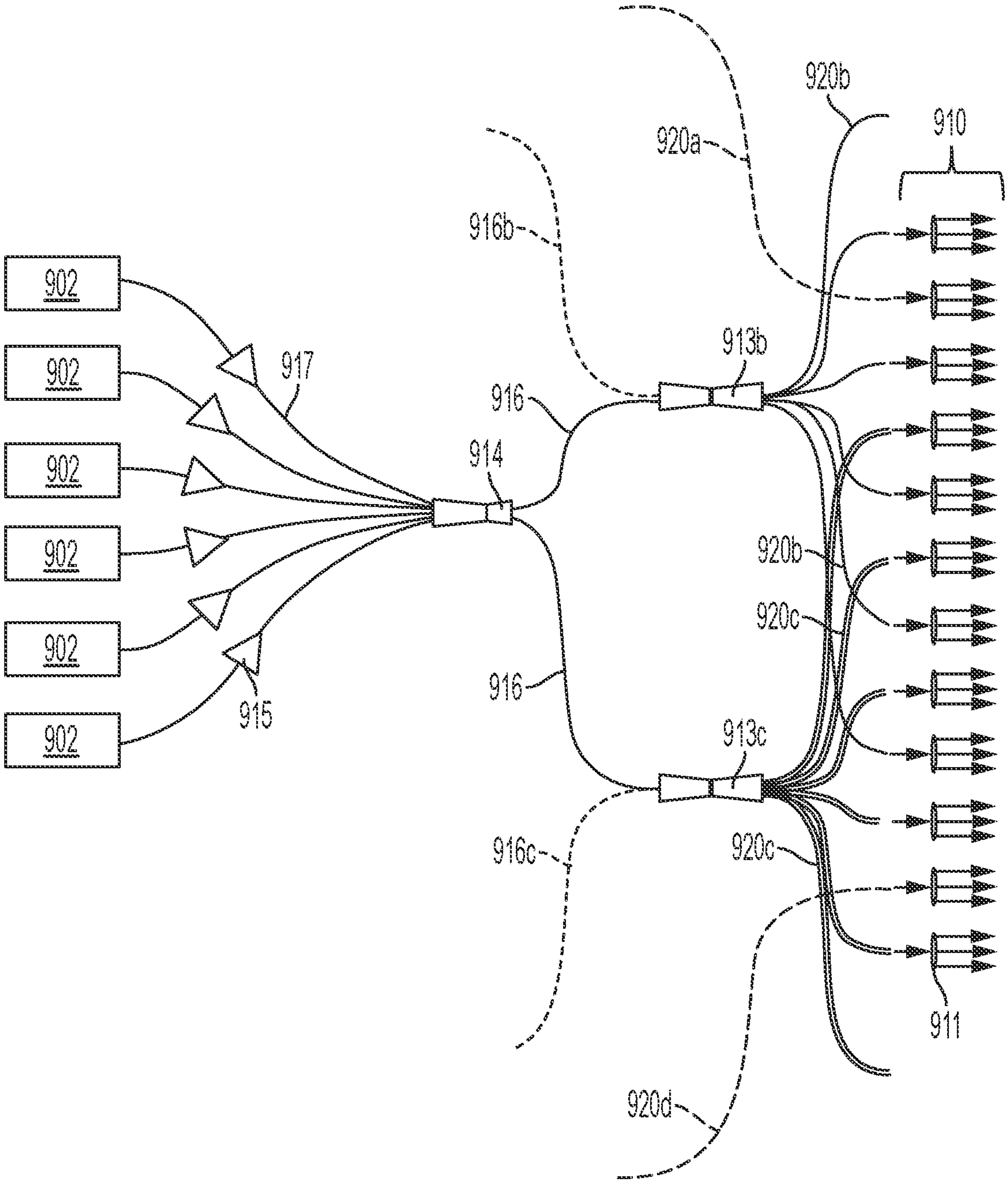
FIG. 9 shows a portion of a network of energy paths within an additive manufacturing system according to another embodiment.

FIG. 9 depicts a portion of a network of energy paths within an additive manufacturing system according to some embodiments. In the depicted embodiment, separate downstream optical fibers (third stage optical fibers as illustrated) are interleaved such that the optical fiber energizing each laser energy pixel emanates from a different photonic lantern than that of the optical fibers that energize an adjoining laser energy pixel. The interleaved optical fibers may provide greater redundancy than the embodiment of FIG. 8 which is similar but for the interleaved downstream optical fibers.

Similar to the previously described embodiments, the network of energy paths optically couples a plurality of laser energy sources 902 to a microlens array 910 and/or other appropriate optics for directing the laser energy onto a build surface, not depicted, to form a plurality of laser energy pixels thereon. A plurality of first stage optical fibers 917 are optically coupled to separate laser energy sources 902 of a plurality of laser energy sources. A fiber amplifier 915 is located in line with each first stage optical fiber 917. A downstream end portion of the first stage optical fibers are optically coupled to a set of photonic lanterns of a first plurality of photonic lanterns 914 (only one set of photonic lanterns of the first plurality of photonic lanterns is depicted). A separate second stage optical fiber 916 is optically coupled with a downstream portion of each one of the first plurality of photonic lanterns 914. The second stage optical fiber 916 is optically coupled with an upstream portion of a second set of a second plurality photonic lanterns 913*b*/913*c* (two of the second plurality photonic lanterns are shown). Second stage fibers 916*b* and 916*c* connect with downstream end portions of photonic lanterns (not shown) of the first plurality of photonic lanterns 914. In the depicted embodiment, separate second stage optical fibers 916 are optically coupled with downstream portions of the first plurality of photonic lanterns and with an upstream end portion of a set of photonic lanterns of the second plurality of photonic lanterns 913*b*/913*c*. Separate third stage optical fibers 920*b* or 920*c* optically couple a downstream portion of the one of the second plurality of photonic lanterns to the array of microlenses 910 or other appropriate optics for directing the laser energy onto a build surface, not depicted. A separate third stage optical fiber 920*b* emanates from a downstream portion of the photonic lantern 913*b* of the second plurality of photonic lanterns. Another separate third stage optical fiber 920*c* emanates from a downstream portion of the photonic lantern 913*c* of the second plurality of photonic lanterns. The third stage optical fibers are interleaved before emitting laser energy to the linear array of microlenses 910, such that a third stage optical fiber 920*b* will adjoin a third stage optical fiber 920*c*. Separate third stage optical fibers 920*a* and 920*d* emanate from photonic lanterns of the second plurality of photonic lanterns (from photonic lanterns of the second plurality of photonic lanterns which are not depicted). As depicted, the illustration may represent only a portion of a larger network of energy paths. As with previously described embodiments, each microlens 911 of the microlens array 910 receives laser energy emitted from a single separate third stage optical fiber. The microlens array 910 may reside within the optics assembly in some embodiments. In the depicted embodiment, the first stage optical fibers 917 and the third stage optical fibers 920 may be single mode optical fibers and the second stage optical fibers 916 may be multimode optical fibers. The third stage optical fibers (any of 920*a-c* illustrated) may be referred to as a downstream optical fibers as they represent the most downstream optical fiber in their respective energy path. A downstream optical fiber, microlens 911, and other optics that may be within an optics assembly between the downstream optical fiber and the build surface may be termed a downstream energy path. Of course, while specific numbers and arrangements of energy paths, laser energy sources, and photonic lanterns are illustrated, other numbers and arrangements of these components are contemplated as this disclosure is not so limiting.

The embodiment of FIG. 9 may provide a greater degree of redundancy than the embodiment of FIG. 8. In the event of a single failed component, such as a laser energy source, a fiber path, a photonic lantern (including the most downstream photonic lanterns) or a microlens may not result in a loss of two adjoining (e.g. consecutive) downstream energy paths. Where each downstream energy path independently forms a single laser energy pixel on the build surface, the interlaced downstream optical fibers may mitigate the loss of two adjoining laser energy pixels as the result of a failure of a single component within the network of energy paths. In the event of a failure of non-adjoining laser energy pixels, laser energy beam steering and/or constructive interference between laser energy beams (see also FIGS. 10A-11B below) may fill in the missing failed pixel (or non-adjoining pixels). This may allow an additive manufacturing process to continue, albeit with a potential for increased build time and/or a reduced duty cycle of failure-affected laser energy pixels. The laser power delivered to the failed laser energy pixel location may be lower than the power originally delivered before the failed laser energy pixel failed. For instance, a failed laser energy pixel location filled by an adjoining laser energy pixel may receive half of the original power delivered to that pixel (e.g. the same energy over twice the original time). The intensity of some pixels may be increased to mitigate the energy that is no longer delivered by the failed pixel.

For example, in the embodiment of FIG. 9, the second plurality of photonic lanterns may include a group A of second photonic lanterns and a group B of second photonic lanterns. Photonic lantern 913*c* may be in group A and photonic lantern 913*b* may be in group B. The group A of second photonic lanterns provide laser energy to form a group A of laser energy pixels and the group B of second photonic lanterns provide laser energy to form a group B of laser energy pixels. The group A laser energy pixels are interleaved with the group B laser energy pixels so that group A laser energy pixels adjoin only group B laser energy pixels and group B laser energy pixels adjoin only group A laser energy pixels in the plurality of laser energy pixels on the build surface. A failure of a component in the network of energy paths may affect a single laser energy pixel or some of a group of laser energy pixels (such as group A etc.) but may not affect adjoining laser energy pixels of a different group.

Figure 10A:
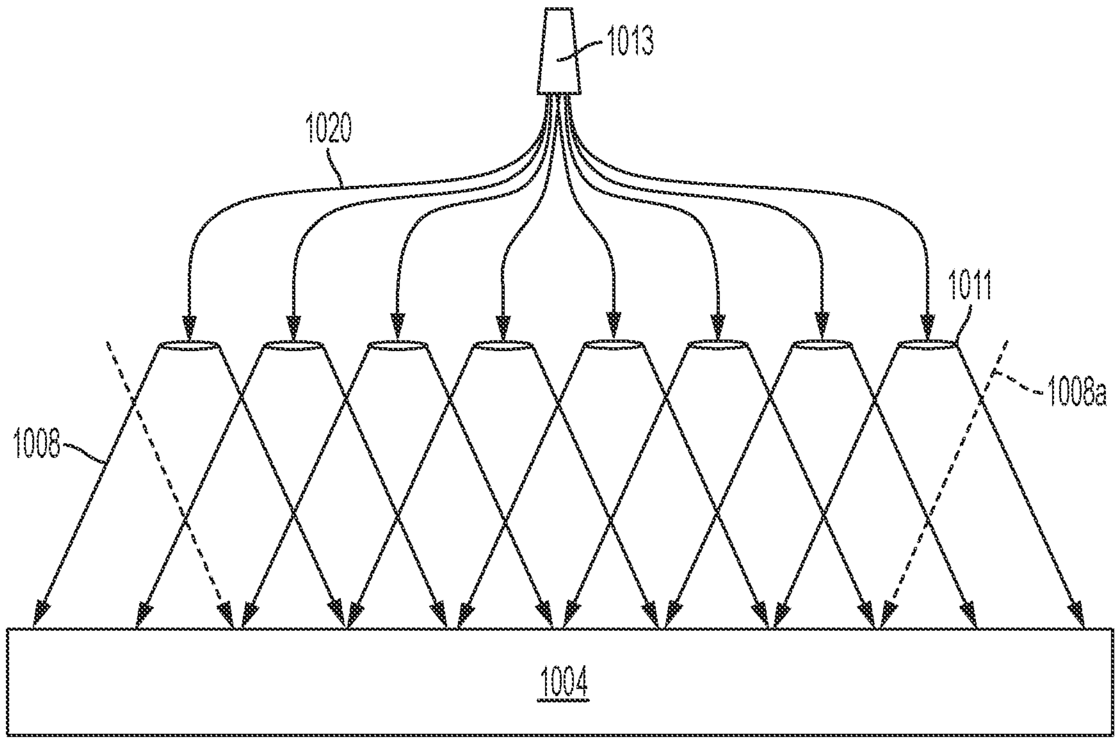
FIG. 10A shows a portion of energy paths with interference between laser energy outputs according to one embodiment.

FIG. 10A shows an array of energy paths according to some embodiments including an array of microlenses configured to create an array (e.g., a linear array) of laser energy pixels on the build surface. In the depicted embodiment, the laser energy beams are controlled such that they at least partially overlap with one another such that interference between individual laser beam outputs creates intensity peaks that form the laser pixels. For example, downstream optical fibers 1020, such as third stage optical fibers of FIG. 8 or 9 or fourth stage optical fibers of FIGS. 5 and 6, are optically coupled to a downstream end portion of photonic lantern 1013 which may be any of the most downstream groups of photonic lanterns disclosed herein, including, for example, one of the second plurality of photonic lanterns in FIG. 8 or 9. The downstream optical fibers 1020 are arranged to form an array (e.g., a linear array) of optical fibers aligned with an array of microlenses 1011. Laser energy is emitted from the end portion of each downstream optical fiber 1020 and directed towards a corresponding microlens 1011. Each microlens 1011 of the linear array of microlenses directs the corresponding one of the plurality of laser energy beams 1008 towards the build surface 1004. It should be appreciated that while an optics assembly is not shown downstream of microlenses 1011, any appropriate type of optics may be used in addition to or in place of the depicted microlenses. In some embodiments, the optics assembly may include mirrors or other components which may change the direction of the laser energy, for example, see the optics assembly 204 of FIG. 2. The microlens and/or other optics may be configured to control the amount of overlap between adjacent laser energy beams 1008 used to form the laser energy pixels on the build surface 1004.

As noted above, the array of downstream optical fibers including a plurality of downstream optical fibers 1020 and the array of microlenses including a plurality of microlenses 1011 forms a plurality of laser energy pixels on the build surface 1004. In some embodiments, the plurality of laser energy pixels is a linear array of laser energy pixels, though two dimensional arrays are also contemplated. In the illustrated embodiment laser energy pixels are formed by constructive interference between two or more beams of laser energy 1008. It should be appreciated that laser energy pixels formed through constructive interference may not align with a longitudinal axis passing through the centerline of an associated emitted beam of laser energy, for example, in some embodiments, a laser energy pixel may be formed on the build surface at a location between the longitudinal axes of two adjacent laser energy beams that overlap with one another to form a laser energy pixel. In other embodiments, the laser energy pixels may be disposed along the longitudinal axis of a corresponding laser energy beam or at any point in between the longitudinal axes of two adjoining beams of laser energy. Interference between two or more adjoining beams of laser energy may be used to control the position of laser energy as discussed below.

Figure 10B:
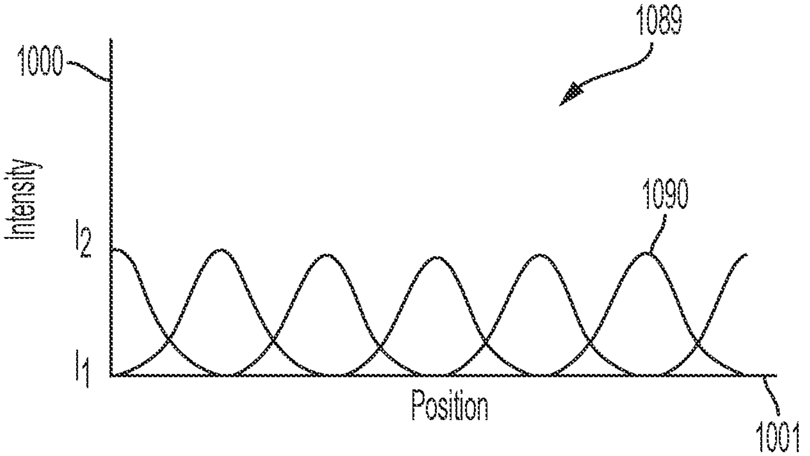
FIG. 10B shows a representative plot of laser energy intensity for the energy paths of FIG. 10A.

FIG. 10B illustrates a representative plot of laser energy vs. position along the build surface for a linear array of laser energy beams that form a linear array of laser energy pixels through constructive interference according to one embodiment. Intensity axis 1000 gives the intensity of the laser energy at a location along the build surface given by Position axis 1001. Intensity curves 1089 show the intensity of laser energy at the build surface. Peaks of laser energy intensity 1090 correspond to laser energy pixels.

The distribution of laser energy intensity is illustrated consistent with a gaussian distribution in the figure although it should be appreciated that any laser energy distribution may be used. Photonic lanterns may produce non-gaussian distributions of laser energy. Peaks of laser energy intensity 1090 (e.g. local maxima of light intensity) are formed by constructive interference of at least two beams of laser energy, where the intensity of the beams together is greater than the intensity of individual beams of laser energy separately. Destructive interference may attenuate the intensity of laser energy in some locations, such as in between laser energy pixels.

Interference of laser energy at the build surface may be controlled by adjusting a focus/dispersion of two or more at least partially overlapping laser energy beams and/or by adjusting the phases and/or intensities of the two or more laser energy beams. This may affect the nature of the interference (constructive or destructive) as well as the position and intensity of the local maxima/minima on the build surface and hence the location of laser energy pixels. Additional optics (e.g., within the optics head) may be used to produce coherent combining interference effects at the build surface. Optics may include slow axis collimators (SAC), fast axis collimators (FAC), cylindrical lenses, macro optics, and/or any other appropriate optics.

Figure 11A:
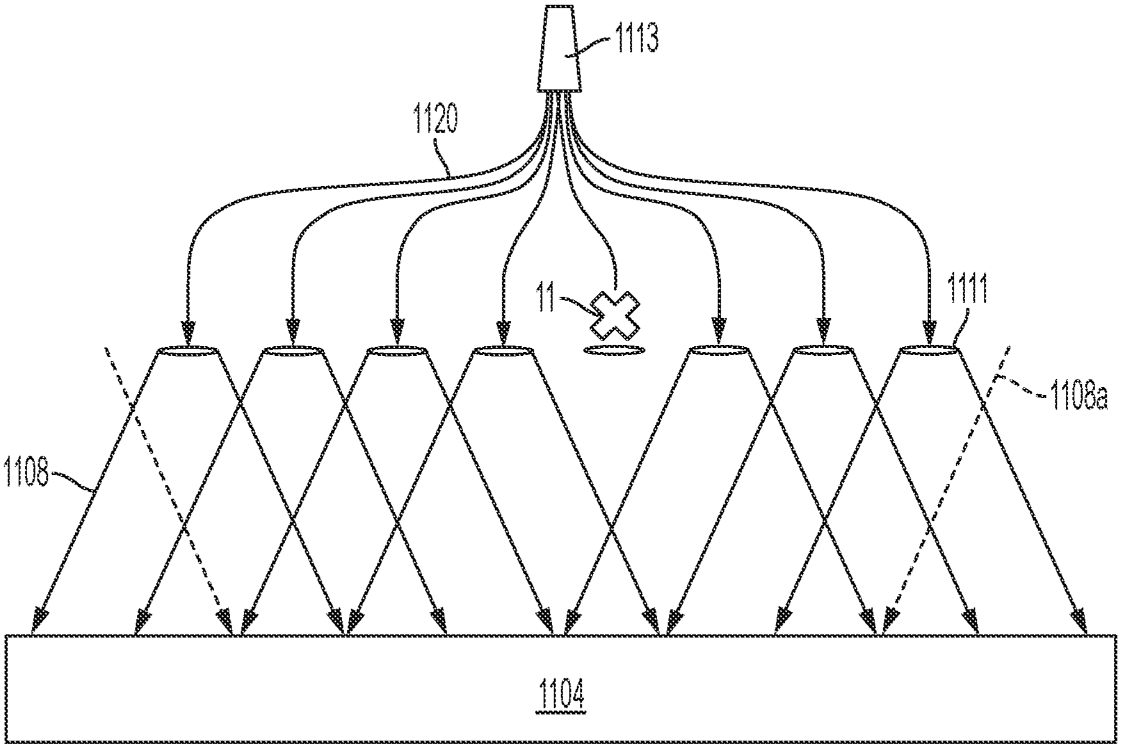
FIG. 11A shows the energy paths of FIG. 10A with a failed laser output according to one embodiment.

FIG. 11A depicts the linear array of energy of the embodiment shown in FIG. 10A where one laser energy pixel is not operational. As in FIG. 10A, downstream optical fibers 1120 form an array of optical fibers aligned with a linear array of microlenses 1111 or other optics, directing laser energy beam 1108 onto a build surface 1104 to interact with one or more other laser energy beams to form a laser energy pixel. As illustrated, energy path 11 is experiencing a failure, such as may result from failure of a downstream optical fiber 1120, photonic lantern 1113, microlens 1111 or other component disposed along the energy path. Redundancy afforded by forming laser energy pixels though constructive interference from multiple overlapping laser energy beams may continue to allow for the formation of a laser energy pixel in spite of the failed energy path.

Figure 11B:
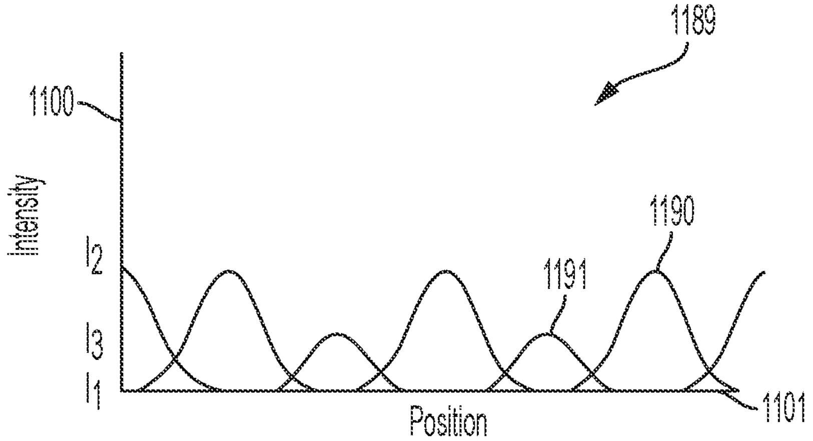
FIG. 11B shows a representative plot of laser energy intensity for the energy paths of FIG. 11A.

FIG. 11B. shows a representative plot of laser energy intensity vs position along the build surface for the linear array of laser pixels depicted in FIG. 11A. Intensity axis 1100 gives the intensity of the laser energy at a location along the build surface given by Position axis 1101. Intensity curves 1189 show the intensity of laser energy at the build surface. Peaks of laser energy intensity 1190 correspond to laser energy pixels. Other local maxima 1191 correspond to laser energy pixels present but of reduced intensity due to the failure in energy path 11.

As may be observed in the representative plot, multiple laser pixels may be affected by a single inoperative laser output, however an interference pattern from the remaining lasers generates local intensity maxima at or near the locations of the affected pixels albeit at a lower intensity. As a result, the inoperative laser output may weaken but not eliminate some laser pixels such that the print may proceed with no lost pixels, though embodiments in which the intensities, phase, and/or other appropriate parameter of the various overlapping laser energy beams are controlled to provide laser energy pixels with little to no change in intensity even in the presence of failed laser energy path are also contemplated. In either case, in some embodiments, the speed of the print may be reduced to compensate for the reduced intensity of the affected laser energy pixels.

Further redundancy of the additive manufacturing system may be gained by combining the laser energy pixel formation of FIGS. 10A and 11A with the interleaved downstream optical fibers of FIG. 9. As previously noted, interleaved downstream optical fibers may mitigate losses from a single component failure to individual non-adjoining downstream energy paths. Limiting failure to non-adjoining energy paths may enable the redundancy described in FIGS. 11A and 11B. However, while overlapping laser energy pixels are described above, it should be understood that the various embodiments disclosed herein are not limited to laser energy pixels in which partially overlapping laser energy beams are used to form the laser energy pixels. For example, an array of separate isolated laser energy pixels may be formed on a build surface as the disclosure is not so limited.

Figure 12:
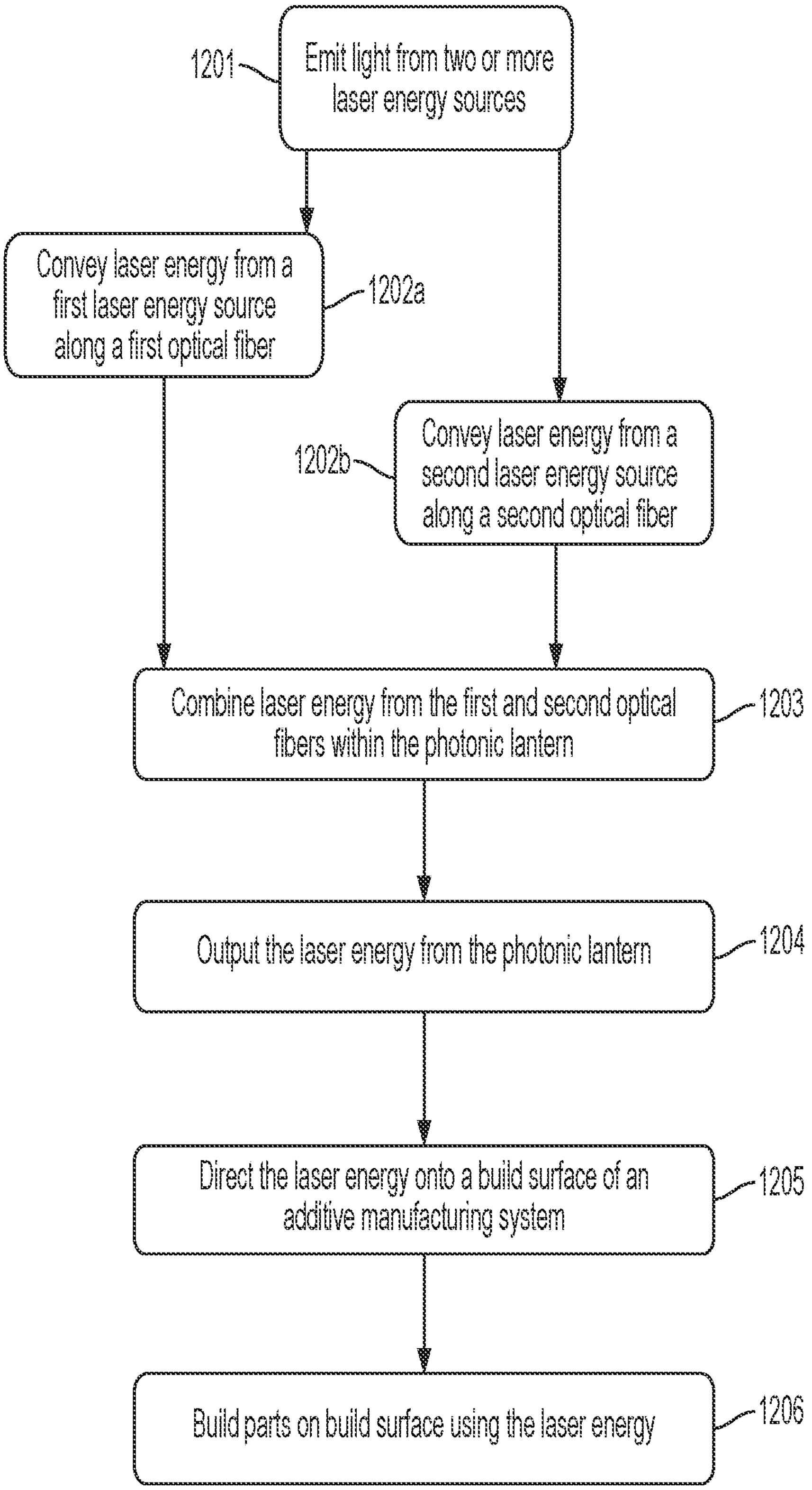
FIG. 12 shows a block diagram of a method for combining laser energy in a photonic lantern according to some embodiments.

FIG. 12 shows a block diagram of a method of combining multiple laser energy sources within a photonic lantern in the energy path of an additive manufacturing system according to some embodiments. First, laser energy is emitted from a plurality of laser energy sources at 1201. The laser energy is conveyed from a first laser energy source along a first optical fiber at 1202*a*. Laser energy from a second laser energy source is conveyed along a second optical fiber at 1202*b*. Both optical fibers may be single mode optical fibers in some embodiments. The laser energy from the first and second optical fibers, as well as other potential optical fibers in some embodiments, may be combined within a photonic lantern at 1203. The photonic lantern may be one of a plurality of photonic lanterns that are combining the laser energy from multiple separate groups of laser energy sources and optical fibers. The combined laser energy may be output from the one or more photonic lanterns at 1204 into an upstream portion of a plurality of optical fibers that optically connect the one or more photonic lanterns to a build surface such that laser energy may be directed onto a build surface of an additive manufacturing system at 1205 to form an array of laser energy pixels on the build surface where an intensity of each laser energy pixels may be adjusted separately. Parts may then be built on the build surface of the additive manufacturing system using the laser energy pixels at 1206.

In some embodiments, the above method may further include measuring the laser energy outputted from the plurality of photonic lanterns with one or more sensors. The measurement may be performed at any convenient location including at the build surface, after the laser energy is directed toward the build surface, in the optics assembly, or in the optical fiber downstream from the photonic lantern. According to some embodiments, the one or more sensors may share some or all of the common optics used to deliver the laser energy form the fiber outputs to the work surface, though instances in which one or more sensors that are separate from the laser energy paths through the system are also contemplated as described previously above. In some embodiments, the method may further include controlling one of an intensity and/or a phase of at least one of the plurality of laser energy sources in response to the measurement of laser energy outputted from the plurality of photonic lanterns.

Figure 13:
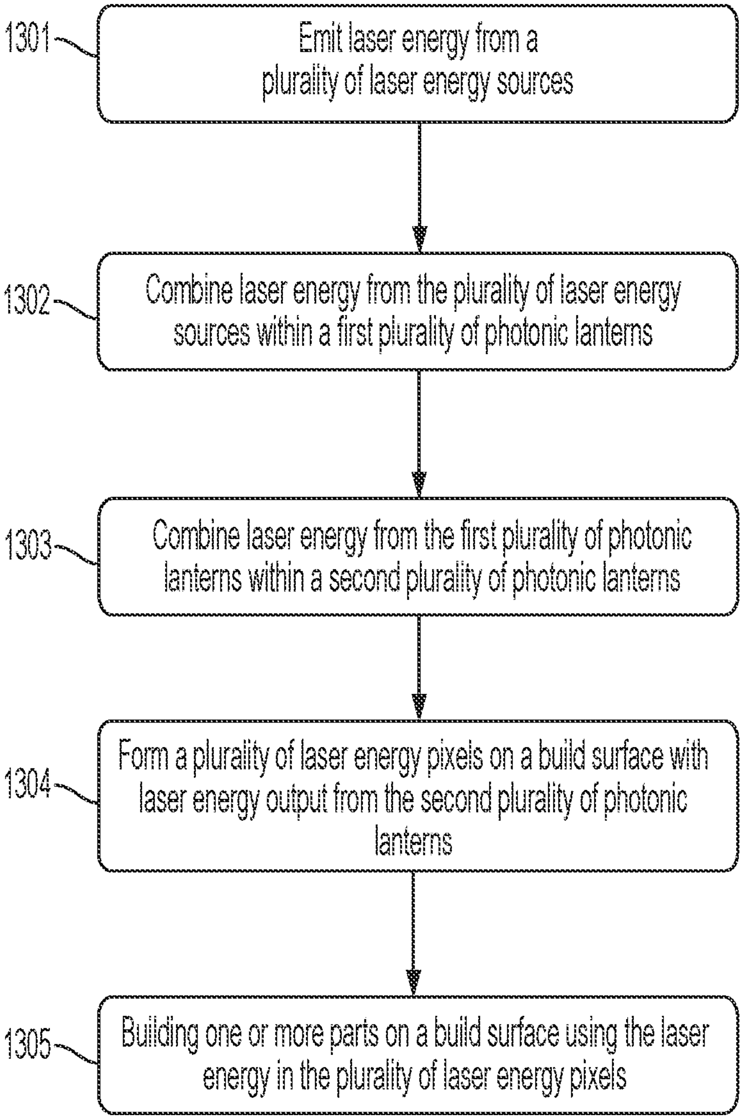
FIG. 13 shows a block diagram for operating an additive manufacturing system according to some embodiments.

FIG. 13 shows a block diagram for a method for operating an additive manufacturing system according to some embodiments. First, laser energy may be emitted from a plurality of laser energy sources 1301. The laser energy emitted from the plurality of laser energy sources may be conveyed from the laser energy sources to a first plurality of photonic lanterns where the laser energy may be combined in the first plurality of photonic at 1302. For example, separate groups of first stage optical fibers may transmit the energy from corresponding groups of laser energy sources to separate photonic lanterns of the first plurality of photonic lanterns where the laser energy from the separate groups of laser energy sources may be combined in the corresponding photonic lantern. The combined laser energy may then be output from the first plurality of photonic lanterns and transmitted to a second plurality of photonic lanterns. For example, a plurality of second stage optical fibers may transmit laser energy from the first plurality of photonic lanterns to the second plurality of photonic lanterns. Again, this may include multiple separate groups of optical fibers and corresponding photonic lanterns and/or other arrangements as described previously. In either case, the laser energy from the first plurality of photonic lanterns may be combined within the second plurality of photonic lanterns at 1303. The combined laser energy may then be output to a plurality of downstream optical fibers which may then be directed from the downstream end portion of each energy path onto a build surface of the additive manufacturing system to form a plurality of laser energy pixels on the build surface at 1304. One or more parts may then be built on the build surface using the laser energy pixels at 1305. In some embodiments additional pluralities of photonic lanterns may be present, for instance a third plurality of photonic lanterns, a fourth plurality of photonic lanterns, etc. as the disclosure is not limiting as to the number of photonic lanterns that laser energy may encounter between a laser energy source and the build surface.

The method of operating an additive manufacturing system of FIG. 13 may additionally include directing laser energy from the downstream optical fibers into one or more optics including, for example, an array of microlenses. The microlenses may focus the laser energy emitted from the downstream optical fibers. This may include directing laser energy through an optics assembly and onto the build surface. Directing laser energy through the optics assembly may include collimating the laser energy, focusing the laser energy, or configuring the dispersion of the laser energy. The method may control the laser energy directed toward the build surface to provide constructive and/or destructive interference between beams of the laser energy to form the laser energy pixels. Intensity peaks generated through constructive interference between beams of laser energy may form the laser energy pixels of the build surface, though instances in which separate non-overlapping laser energy pixels are formed are also contemplated.

According to some embodiments, a method for operating an additive manufacturing system may include operating the energy paths within the additive manufacturing system for redundancy in the event of a failure in a component in the energy path. Photonic lanterns may be used to switch between branches of an energy path, such as to redirect laser energy around a system failure or to reconfigure an additive manufacturing system such as to change a build parameter (e.g., number of active laser energy pixels, etc.). For example, an additive manufacturing system may emit laser energy from a first laser energy source of the plurality of laser energy sources. The laser energy initially forms a first laser energy pixel on the build surface from the laser energy emitted from the first laser energy source. Likewise, the additive manufacturing system may emit laser energy from a second laser energy source of the plurality of laser energy sources and form a second laser energy pixel on the build surface from the laser energy emitted from the second laser energy source. In one example, during a failure or other reason for inoperability of the second laser energy source, the additive manufacturing system may redirect laser energy from the first laser energy source and/or another laser energy source through one of the first plurality of photonic lanterns and through one of the second plurality of photonic lanterns and convey the redirected laser energy to the second laser energy pixel. In the case of a failed component within an energy path, the additive manufacturing system may redirect the laser energy around the failed component in the energy path. Redirecting laser energy may include redirecting laser energy to replace a laser energy source used to energize a specific pixel or redirecting laser energy to apply laser energy from an active laser energy source to a previously unused laser energy pixel.

According to some embodiments, a method for operating an additive manufacturing system may include closed loop control. One or more sensors may measure an output of a photonic lantern, for example intensity, position, intensity distribution, phase, etc. The method may include measuring the output of the photonic lantern after combining laser energy in the photonic lantern. For instance, either or both steps 1302 and 1303 in FIG. 13 may be followed by a measurement step. For example, one or more sensors may be configured to measure one or more properties associated with the laser energy pixels, inputs to the photonic lanterns, and/or outputs from the photonic lanterns. The one or more sensors may be any appropriate type of photosensitive detector as previously described. For instance, the method may include sensing an intensity and/or position of each laser energy pixel within the linear array of laser energy pixels. The sensed data may be transmitted to a controller including one or more processors. The controller may determine operating parameters for controlling a position and/or intensity of each laser energy pixel.

While some embodiments described herein are consistent with laser powder bed fusion additive manufacturing processes, this disclosure is not limited to powder bed fusion additive manufacturing processes. Aspects described herein may be applied to any additive manufacturing system utilizing a plurality of laser energy sources including additive manufacturing processes where the precursor material includes a polymer, composite, ceramic, or a metal. Other examples may include stereolithography (SLA) additive manufacturing processes. This disclosure is not to be so limiting to a specific additive manufacturing process.

Components within an energy path may be optically coupled. Components that are optically coupled may be directly coupled together or those components may be optically coupled through one or more intermediate components or through free space. For instance, a laser energy source may be optically coupled to a photonic lantern if there is a first stage optical fiber (or several stages of optical fibers etc.) between the laser energy source and the photonic lantern.

The above method may be implemented by one or more controllers including at least one processor operatively coupled to the various controllable portions of an additive manufacturing system as disclosed herein. The method may be embodied as computer readable instructions stored on non-transitory computer readable memory associated with the at least one processor such that when executed by the at least one processor the additive manufacturing system may perform any of the actions related to the methods disclosed herein. Additionally, it should be understood that the disclosed order of the steps is exemplary and that the disclosed steps may be performed in a different order, simultaneously, and/or may include one or more additional intermediate steps not shown as the disclosure is not so limited.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device including one or more processors may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. An additive manufacturing system comprising:

a build surface;

a plurality of laser energy sources;

a plurality of photonic lanterns optically coupled to the plurality of laser energy sources, wherein each photonic lantern of the plurality of photonic lanterns is configured to combine laser energy from at least two laser energy sources of the plurality of laser energy sources; and an optics assembly configured to direct laser energy from the plurality of photonic lanterns toward the build surface to form a plurality of laser energy pixels on the build surface.

2. The additive manufacturing system of claim 1, wherein each photonic lantern of the plurality of photonic lanterns is optically coupled to at least two laser energy pixels of the plurality of laser energy pixels.

3. The additive manufacturing system of claim 1, further comprising an array of microlenses disposed downstream of the plurality of photonic lanterns, wherein each laser energy pixel is optically coupled with a separate microlens of the array of microlenses.

4. The additive manufacturing system of claim 1, wherein a number of energy paths decreases in a downstream direction when crossing a photonic lantern of the plurality of photonic lanterns in the downstream direction.

5. The additive manufacturing system of claim 1, wherein a number of energy paths increases in a downstream direction when crossing a photonic lantern of the plurality of photonic lanterns in the downstream direction.

6. The additive manufacturing system of claim 1, wherein the plurality of laser energy pixels comprises a linear array of laser energy pixels, and wherein each laser energy pixel in the linear array of laser energy pixels emanates from a photonic lantern different from the photonic lantern from which an adjoining laser energy pixel emanates.

7. The additive manufacturing system of claim 1, wherein a laser power output from a photonic lantern of the plurality of photonic lanterns is configured to be in a range of 100 W to 5000 W.

8. The additive manufacturing system of claim 1, further comprising:

a plurality of first stage optical fibers, each first stage optical fiber optically connected with one of the plurality of laser energy sources and one of the plurality of photonic lanterns; and a plurality of second stage optical fibers, wherein each optical fiber of the plurality of second stage optical fibers is optically connected to a downstream end portion of a photonic lantern of the plurality of photonic lanterns.

9. The additive manufacturing system of claim 8, wherein the plurality of photonic lanterns is a first plurality of photonic lanterns, and further comprising a second plurality of photonic lanterns, wherein the second plurality of photonic lanterns is disposed downstream from and is optically coupled to the plurality of second stage optical fibers, and wherein the plurality of second stage optical fibers are multi-mode optical fibers.

10. The additive manufacturing system of claim 1, wherein the optics assembly is configured to form the plurality of laser energy pixels on the build surface through interference generated by an interaction of two or more adjacent laser energy beams.

11. An additive manufacturing system comprising:
- a build surface;
- a plurality of laser energy sources;
- a first plurality of photonic lanterns optically coupled to the plurality of laser energy sources, wherein each photonic lantern of the first plurality of photonic lanterns is configured to combine laser energy from at least two laser energy sources of the plurality of laser energy sources; and
- a second plurality of photonic lanterns optically coupled to the first plurality of photonic lanterns, wherein each photonic lantern of the second plurality of photonic lanterns is configured to combine laser energy from at least two photonic lanterns of the first plurality of photonic lanterns to form a plurality of laser energy pixels on the build surface.

12. The additive manufacturing system of claim 11, further comprising an optics assembly configured to direct laser energy from the second plurality of photonic lanterns toward the build surface to form the plurality of laser energy pixels on the build surface.

13. The additive manufacturing system of claim 11, further comprising:
- a plurality of first stage optical fibers optically coupled to the first plurality of photonic lanterns at upstream end portions of the first plurality of photonic lanterns;
- a plurality of second stage optical fibers optically coupled to the first plurality of photonic lanterns at downstream end portions of the first plurality of photonic lanterns and optically coupled to the second plurality of photonic lanterns at upstream end portions of the second plurality of photonic lanterns; and
- a plurality of third stage optical fibers optically coupled to the second plurality of photonic lanterns at downstream end portions of the second plurality of photonic lanterns.

14. The additive manufacturing system of claim 13, wherein at least one photonic lantern of the first plurality of photonic lanterns and at least one photonic lantern of the second plurality of photonic lanterns are configured to selectively direct laser energy from one first stage optical fiber to any one of a group of third stage optical fibers, and wherein the selective direction of laser energy from one first stage optical fiber to any one of the group of third stage optical fibers selectively energizes any one of a group of laser energy pixels on the build surface.

15. The additive manufacturing system of claim 13, further comprising a third plurality of photonic lanterns, wherein the third plurality of photonic lanterns is optically coupled to the first plurality of photonic lanterns and to the second plurality of photonic lanterns, wherein the third plurality of photonic lanterns is configured to combine laser energy from at least two photonic lanterns of the first plurality of photonic lanterns and wherein the second plurality of photonic lanterns are configured to combine laser energy from the third plurality of photonic lanterns.

16. The additive manufacturing system of claim 11, wherein the plurality of laser energy pixels includes:
- a first laser energy pixel; and
- a second laser energy pixel, and wherein the plurality of laser energy sources includes:
- a first laser energy source; and
- a second laser energy source,
- wherein at least one of the first plurality of photonic lanterns and at least one of the second plurality of photonic lanterns are configured to direct laser energy from the first laser energy source to the first laser energy pixel, and wherein at least one of the first plurality of photonic lanterns and at least one of the second plurality of photonic lanterns are configured to direct laser energy from the second laser energy source to the second laser energy pixel and wherein at least one of the first plurality of photonic lanterns and at least one of the second plurality of photonic lanterns are further configured to redirect laser energy from the first laser energy source to the second laser energy pixel and from the second laser energy source to the first laser energy pixel.

17. The additive manufacturing system of claim 16, wherein the at least one of the first plurality of photonic lanterns and the at least one of the second plurality of photonic lanterns are further configured to redirect laser energy from the first laser energy source to the second laser energy pixel in response to a failure of at least one of a laser energy source, an optical fiber, or a photonic lantern.

18. The additive manufacturing system of claim 11, wherein the plurality of laser energy pixels forms an array of laser energy pixels, and wherein one of the first plurality of photonic lanterns and one of the second plurality of photonic lanterns are configured to selectively transmit laser energy from any one of the plurality of laser energy sources to any laser energy pixel within the array of laser energy pixels.

19. The additive manufacturing system of claim 11, further comprising:
- a sensor configured to monitor laser energy emitted from the second plurality of photonic lanterns; and
- a processor;
- wherein the processor is configured to adjust at least one of an intensity and a phase of at least one of the plurality of laser energy sources based at least in part on data received from the sensor.

20. The additive manufacturing system of claim 11, wherein the plurality of laser energy pixels comprises a linear array of laser energy pixels, and wherein the linear array of laser energy pixels includes at least ten laser energy pixels.

21. The additive manufacturing system of claim 15 further comprising a linear array of microlenses wherein each microlens within the linear array of microlenses receives an output of a single corresponding third stage optical fiber, and wherein the plurality of laser energy pixels is a linear array of laser energy pixels formed by a light intensity pattern generated at the build surface through constructive interference between laser energy outputs originating from separate microlenses within the linear array of microlenses.

22. The additive manufacturing system of claim 11, wherein the second plurality of photonic lanterns is configured to form the plurality of laser energy pixels on the build surface through interference generated by an interaction of two or more separate beams of laser energy.

23. A method for operating an additive manufacturing system, the method comprising:

emitting laser energy from a plurality of laser energy sources;

combining the laser energy from the plurality of laser energy sources within a plurality of photonic lanterns;

directing the laser energy from the plurality of photonic lanterns toward a build surface to form a plurality of laser energy pixels on the build surface; and building one or more parts on the build surface using the laser energy in the plurality of laser energy pixels.

24. The method of claim 23, further comprising focusing the laser energy emitted from the plurality of photonic lanterns with an array of microlenses.

25. The method of claim 23, further comprising directing the laser energy emitted from the plurality of photonic lanterns to an optics assembly.

26. The method of claim 23, further comprising modulating at least one of an intensity and a phase of the plurality of laser energy sources.

27. The method of claim 23, further comprising measuring the laser energy emitted from the plurality of photonic lanterns with a sensor, and controlling at least one of an intensity or a phase of at least one of the plurality of laser energy sources in response to the measurement of laser energy emitted from the plurality of photonic lanterns.

28. The method of claim 23, further comprising:

generating interference between two or more beams of laser energy directed toward the build surface; and forming the plurality of laser energy pixels from intensity peaks created by the interference of the two or more beams of laser energy.

29. The method of claim 23, wherein building the one or more parts on the build surface using the laser energy in the plurality of laser energy pixels comprises fusing a precursor material deposited on the build surface using one or more laser energy pixels of the plurality of laser energy pixels.

30. A part built using the method of claim 23.

31. A method for operating an additive manufacturing system, the method comprising:

emitting laser energy from a plurality of laser energy sources;

combining the laser energy from the plurality of laser energy sources within a first plurality of photonic lanterns;

combining the laser energy from the first plurality of photonic lanterns within a second plurality of photonic lanterns;

forming a plurality of laser energy pixels on a build surface with laser energy output from the second plurality of photonic lanterns; and building one or more parts on the build surface using the laser energy in the plurality of laser energy pixels.

32. The method of claim 31, further comprising:

conveying laser energy along a first plurality of optical fibers between the plurality of laser energy sources and the first plurality of photonic lanterns; and conveying laser energy along a second plurality of optical fibers between the first plurality of photonic lanterns and the second plurality of photonic lanterns.

33. The method of claim 32, further comprising:

conveying laser energy output from the second plurality of photonic lanterns along a plurality of downstream optical fibers;

focusing laser energy from the plurality of downstream optical fibers with a linear array of microlenses;

directing the focused laser energy from the microlenses toward the build surface; and forming a linear array of laser energy pixels on the build surface with the focused laser energy.

34. The method of claim 33, further comprising:

combining the focused laser energy from the microlenses;

generating an energy intensity pattern through interference of the combined focused laser energy from the microlenses; and forming the linear array of laser energy pixels on the build surface with the energy intensity pattern wherein the laser energy pixels are formed by peaks of the energy intensity pattern.

35. The method of claim 31, further comprising:

emitting laser energy from a first laser energy source of the plurality of laser energy sources;

forming a first laser energy pixel on the build surface from the laser energy emitted from the first laser energy source;

emitting laser energy from a second laser energy source of the plurality of laser energy sources;

forming a second laser energy pixel on the build surface from the laser energy emitted from the second laser energy source;

redirecting laser energy from the first laser energy source through one of the first plurality of photonic lanterns and one of the second plurality of photonic lanterns; and conveying the redirected laser energy from the first laser energy source to the second laser energy pixel, wherein the laser energy is redirected from the first laser energy source to the second laser energy pixel in response to a failure of at least one of a photonic lantern, an optical fiber, or a laser energy source.

36. The method of claim 31, further comprising measuring the laser energy output from the second plurality of photonic lanterns with a sensor, and controlling at least one of an intensity or a phase of at least one of the plurality of laser energy sources in response to the measurement produced by the sensor.

37. The method of claim 31, further comprising:

outputting the laser energy from the second plurality of photonic lanterns to an optics assembly; and directing the laser energy through the optics assembly onto the build surface.

38. The method of claim 31, further comprising combining the laser energy from the first plurality of photonic lanterns within a third plurality of photonic lanterns.

39. The method of claim 31, wherein building the one or more parts on the build surface using the laser energy in the plurality of laser energy pixels comprises fusing a precursor material deposited on the build surface using one or more laser energy pixels of the plurality of laser energy pixels.

40. A part built using the method of claim 31.

* * * * *